US010567691B2

(12) United States Patent
Otaka et al.

(10) Patent No.: US 10,567,691 B2
(45) Date of Patent: Feb. 18, 2020

(54) SOLID-STATE IMAGING DEVICE, METHOD FOR DRIVING SOLID-STATE IMAGING DEVICE, AND ELECTRONIC APPARATUS

(71) Applicant: Brillnics Inc., Grand Cayman (KY)

(72) Inventors: Toshinori Otaka, Tokyo (JP); Naoto Yasuda, Tokyo (JP); Yusuke Sawai, Tokyo (JP)

(73) Assignee: BRILLINCS INC., Grand Cayman (KY)

( * ) Notice: Subject to any disclaimer, the term of this patent is extended or adjusted under 35 U.S.C. 154(b) by 0 days.

(21) Appl. No.: 16/175,312

(22) Filed: Oct. 30, 2018

(65) Prior Publication Data

US 2019/0141270 A1    May 9, 2019

(30) Foreign Application Priority Data

Nov. 6, 2017   (JP) .................. 2017-213852

(51) Int. Cl.
*H04N 5/378*    (2011.01)
*H04N 5/235*    (2006.01)
*H04N 5/361*    (2011.01)
*H04N 3/14*    (2006.01)

(52) U.S. Cl.
CPC .......... *H04N 5/378* (2013.01); *H04N 3/1562* (2013.01); *H04N 5/2355* (2013.01); *H04N 5/361* (2013.01)

(58) Field of Classification Search
CPC ...... H04N 5/378; H04N 5/379; H04N 3/1562; H04N 5/2355; H04N 5/35527; H04N 5/3591; H04N 5/361; H04N 5/37452; H04N 5/37455
See application file for complete search history.

(56) References Cited

U.S. PATENT DOCUMENTS

| 7,164,114 B2 | 1/2007 | Lai et al. |
| 8,553,122 B2 | 10/2013 | Nitta et al. |
| 9,313,435 B2 | 4/2016 | Nitta et al. |
| 9,769,411 B2 | 9/2017 | Nitta et al. |
| 2010/0181464 A1 | 7/2010 | Veeder |

(Continued)

FOREIGN PATENT DOCUMENTS

| JP | 2005-278135 A | 10/2005 |
| JP | 2005-295346 A | 10/2005 |

*Primary Examiner* — Nicholas G Giles
(74) *Attorney, Agent, or Firm* — Westerman, Hattori, Daniels & Adrian, LLP

(57) ABSTRACT

A comparator in an AD conversion part performs, under the control of reading part, a first comparison processing outputting a digitized first comparison result signal with respect to a voltage signal corresponding to an overflow charge overflowing from a PD1 to an FD1 in an integration period and a second comparison processing outputting a digitized second comparison result signal with respect to a voltage signal corresponding to a accumulated charge of the PD1 transferred to the FD1 in a transfer period after the integration period and, in the first comparison processing, starts an AD conversion processing comparing the voltage signal of the output buffer part and the reference voltage and outputting the digitized comparison result signal with a delay from the starting time of the first comparison processing. The comparator lowers a power consumption and suppresses an influence of a dark current of the FD and deterioration of an image.

19 Claims, 26 Drawing Sheets

Read out timing example

(56) References Cited

U.S. PATENT DOCUMENTS

| | | |
|---|---|---|
| 2011/0199526 A1 | 8/2011 | Nitta et al. |
| 2014/0285697 A1 | 9/2014 | Nitta et al. |
| 2015/0014517 A1* | 1/2015 | Ikebe ............... H03M 1/14 250/208.1 |
| 2015/0288906 A1* | 10/2015 | Saito ............... H04N 5/374 348/305 |
| 2016/0295145 A1 | 10/2016 | Nitta et al. |
| 2018/0098037 A1* | 4/2018 | Kumaki ............ H03M 1/0658 |

* cited by examiner

Light to time conversion plot at various reference voltage at comparator input

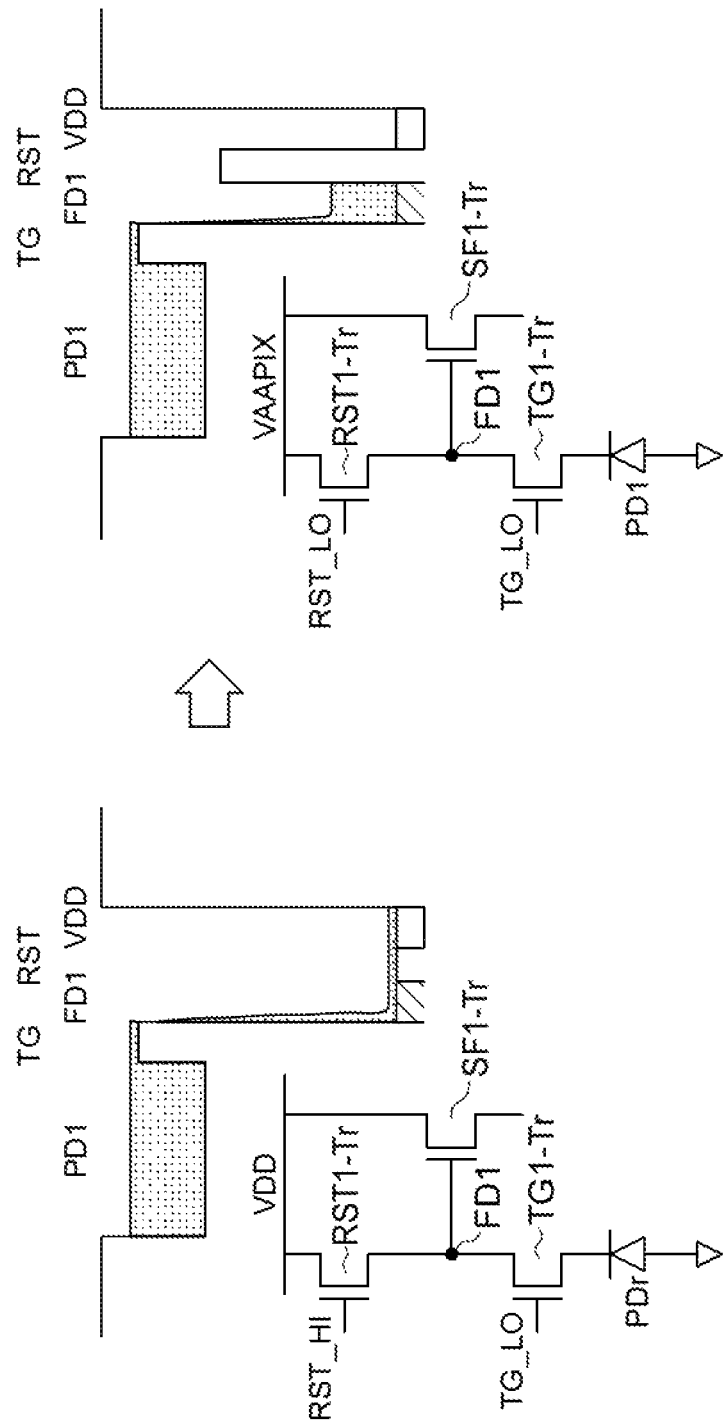

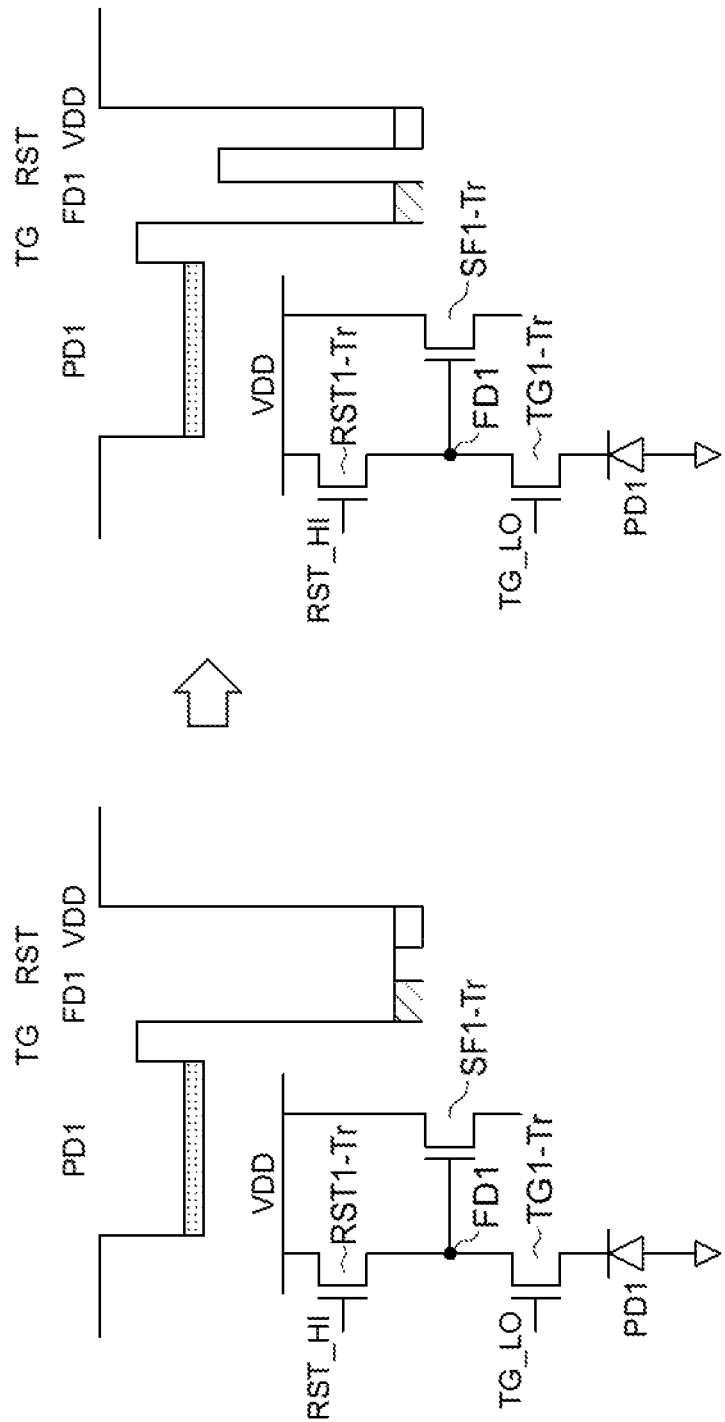

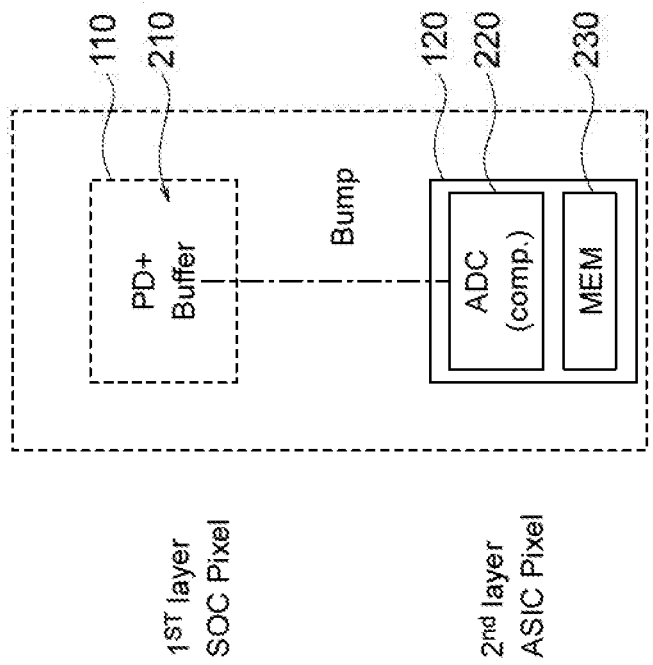
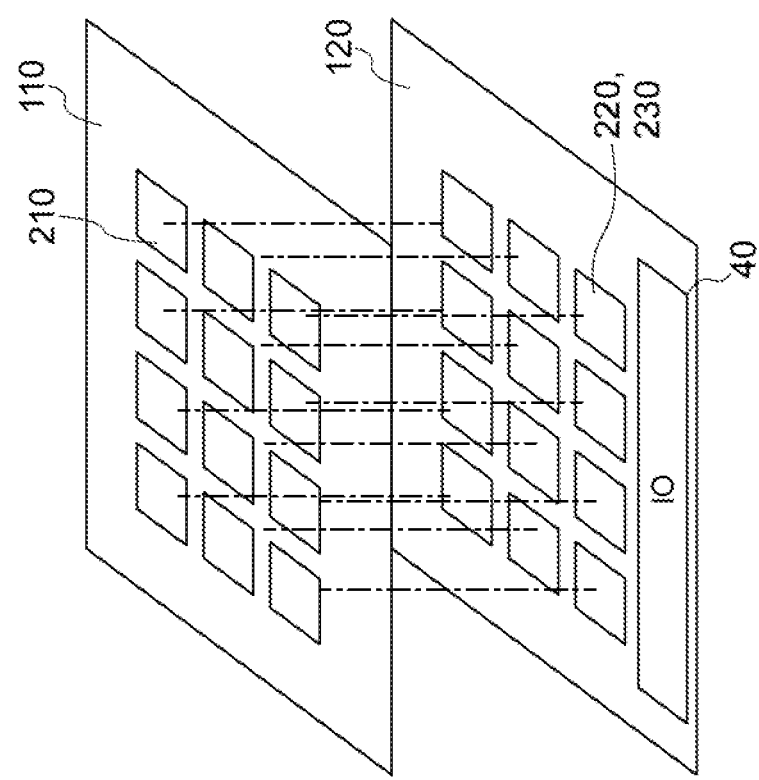

Read out timing example

An example of time to flip sequence.
(ramped reference voltage)

An example of light – digital code plot.
15n sampling for 256 code (3usec integration time)
150uV/e with linear ramped reference voltage (10mV ~ 800mV)

FIG. 26

Linear Ramp Method

| ADC Clock Period[ns] | 10 | 20 | 40 | 1280 |
|---|---|---|---|---|
| Max.Lux in FD [Mlux] | 11.7 | 5.86 | 2.93 | 0.092 |
| DR [dB] | 120 | 114 | 108 | 78 |
| ADC Cnt. [LSB] | 400 | 200 | 100 | 3 |

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

The present invention contains subject matter related to Japanese Patent Application JP 2017-213852 filed in the Japan Patent Office on Nov. 6, 2017, the entire contents of which being incorporated herein by reference.

The present invention relates to a solid-state imaging device, a method for driving a solid-state imaging device, and an electronic apparatus.

BACKGROUND ART

As solid-state imaging devices (image sensors) using photoelectric conversion elements detecting light and generating a charge, CMOS (complementary metal oxide semiconductor) image sensors have been put into practical use. CMOS image sensors have been widely applied as parts of digital cameras, video cameras, monitoring cameras, medical endoscopes, personal computers (PC), mobile phones and other portable terminals (mobile devices) and other various types of electronic apparatuses.

A CMOS image sensor has a floating diffusion (FD) amplifier having a photodiode (photoelectric conversion element) and an FD layer (FD) for each pixel. Reading is performed by selecting a certain row in a pixel array and simultaneously reading out the pixels in a column direction, that is, a column parallel output type is the mainstream.

Further, various circuits have been proposed for the pixel signal read-out (output) circuit of a column parallel output type CMOS image sensor. Among them, one of the most advanced circuits is a circuit which is provided with an analog-to-digital converter (ADC) for each column and extracts pixel signals as digital signals (for example, see Japanese Patent Publication No. 2005-278135 and Japanese Patent Publication No. 2005-295346).

In this column parallel ADC-mounting CMOS image sensor (column AD system CMOS image sensor), a comparator compares a so-called RAMP wave and the pixel signals and performs digital CDS by a later stage counter to thereby perform AD conversion.

In this type of CMOS image sensor, however, while high speed transfer of signals is possible, there is the disadvantage that a global shutter reading operation cannot be carried out.

Contrary to this, a digital pixel sensor in Which an ADC including a comparator (and further a memory part) is arranged in each pixel to also enable realization of a global shutter for executing the start of exposure and end of exposure at the same timings with respect to all pixels in the pixel array has been proposed (for example, see U.S. Pat. No. 7,164,114, B2, FIG. 4 And US Patent No. 2010/0181464, A1).

Technical Problem

In this regard, however, in the CMOS image sensors provided with the conventional digital pixel sensors explained above, it is possible to realize a global shutter function, but for example charges overflowing from the photodiodes in the integration period are not utilized in real time, therefore there is a limit to achievement of a broader dynamic range and higher frame rate.

Further, the important performance indexes of CMOS image sensors include random noise. It is known that the main sources of random noise are the pixels and AD converters. In general, as techniques for reducing random noise, the methods are known of enlarging the transistor size to reduce flicker noise or of adding a capacity to the output of the comparator and lowering the bandwidth to thereby aim at a filter effect of noise by CDS. However, in each technique, there are disadvantages such as an increase of area, degradation of inversion delay of the comparator due to the increase of capacity, and the frame rate of the imaging element not being able to be raised.

Further, since an ADC (further a memory part) including a comparator is arranged in each pixel, it is difficult to expand the effective pixel region to the maximum limit and is difficult to maximize the value relative to the cost.

Further, as methods for expanding the dynamic range, for example, there are known the method of reading out two types of signals which are different in integration period from the same pixel in the image sensor and combining these two types of signals to thereby expand the dynamic range, the method of combining a signal having a small dynamic range in a pixel of high sensitivity and a signal expanded in the dynamic range in a pixel of low sensitivity to thereby expand the dynamic range, and other methods.

In all of the methods, a plurality of signals to be combined must be almost equally held in the linearity of the output voltage with respect to each quantity of incident light (illumination) in the vicinity of the signal values for which combination (switching of signals) is carried out. Each signal is designed so that the gain with respect to the quantity of light (illumination) is different in order to expand the dynamic range (D range), therefore mainly linearities (or inclinations) are held the same in the analog-to-digital converters (ADC) by correcting gains in the digital signal processing circuits after the digital conversion.

In this regard, if trying to utilize the overflow charges overflowing from photodiodes in an integration period (exposure period) in real time in an CMOS image sensor provided with digital pixel sensors, in this integration period, it is necessary to make a bias current of the source follower element and a bias current of the comparator always active, so there is a disadvantage such as high power consumption.

Further, if for example trying to utilize the overflow charges overflowing from photodiodes in an integration period (exposure period) in real time in an CMOS image sensor provided with digital pixel sensors, even in this integration period, an inversion timing of the comparator fluctuates upon receipt of the influence of a dark current of the floating diffusion FD as the output node and its shot noise. For this reason, there are the disadvantages such as occurrence of erroneous judgment of the comparator and an insensitive input range and occurrence of non-linearity in offset of images in the entire column, that is, fixed pattern noise (FPN), and in the AC conversion transfer curve.

It is difficult to separate the charge of the dark current of the floating diffusion FD from an actual overflow charge, therefore a joining gap (AD conversion code gap) is generated at joining points of a high light side AD conversion transfer curve and a low light side AD conversion transfer curve to be joined (boundary of AD conversion codes), so sons times the linearity is not always guaranteed in a switching region. In such a case, there are the disadvantages that smooth switching becomes impossible, discontinuous points by that become noise, and this becomes a cause of so-called tone jump or other image deterioration.

SUMMARY

The present invention provides a solid-state imaging device capable of lowering power consumption, capable of suppressing an influence of the dark current of a floating diffusion as an output node, and capable of suppressing deterioration of the image while substantially realizing a broader dynamic range and a higher frame rate, a method for driving such a solid-state imaging device, and an electronic apparatus. Further, the present invention provides a solid-state imaging device capable of lowering power consumption, capable of suppressing an influence of the dark current of a floating diffusion as an output node, capable of suppressing deterioration of the image while substantially realizing a broader dynamic range and a higher frame rate, and in addition capable of lowering noise, capable of expanding the effective pixel region to the maximum limit, and capable of raising the value relative to the cost to the maximum limit, a method for driving such a solid-state imaging device, and an electronic apparatus.

Solution to Problem

A solid-state imaging device of a first aspect of the present invention has a pixel part in which pixels for performing photoelectric conversion are arranged and a reading part which reads out pixel signals from the pixels in the pixel part, wherein each of the pixels includes a photoelectric conversion element which accumulates a charge generated by photoelectric conversion in an integration period, a transfer element capable of transferring the charge accumulated in the photoelectric conversion element in a transfer period after the integration period, an output node formed by a floating diffusion to which the charge accumulated in the photoelectric conversion element is transferred through the transfer element, an output buffer part which converts the charge at the output node to a voltage signed, corresponding to a quantity of the charge and outputs the converted voltage signal, and a comparator which performs comparison processing comparing the voltage signal of the output buffer part and a reference voltage and outputting the digitized comparison result signal, and the comparator, under the control of the reading part, performs a first comparison processing outputting a digitized first comparison result signal with respect to the voltage signal corresponding to the overflow charge overflowing from the photoelectric conversion element to the output node in the integration period and a second comparison processing outputting a digitized second comparison result signal with respect to the voltage signal corresponding to the accumulated charge of the photoelectric conversion element transferred to the output node in the transfer period after the integration period and, in the first comparison processing, starts an analog-to-digital (AD) conversion processing comparing the voltage signal of the output buffer part and the reference voltage and outputting the digitized comparison result signal with a delay from the starting time of the first comparison processing.

A second aspect of the present invention is a method for driving a solid-state imaging device having a pixel part in which pixels for performing photoelectric conversion are arranged and a reading part which reads out the pixel signals from the pixels in the pixel part, wherein each of the pixels includes a photoelectric conversion element which accumulates a charge generated by photoelectric conversion in an integration period, a transfer element capable of transferring the charge accumulated in the photoelectric conversion element in a transfer period after the integration period, an output node formed by a floating diffusion to which the charge accumulated in the photoelectric conversion element is transferred through the transfer element, an output buffer part which converts the charge at the output node to a voltage signal corresponding to a quantity of the charge and outputs the converted voltage signal, and a comparator which performs comparison processing comparing the voltage signal of the output buffer part and the reference voltage and outputting the digitized comparison result signal, comprising, when reading out the pixel signals of the pixels, in the comparator, under the control of the reading part, performing a first comparison processing outputting a digitized first comparison result signal with respect to a voltage signal corresponding to an overflow charge overflowing from the photoelectric conversion element to the output node in the integration period and a second comparison processing outputting a digitized second comparison result signal with respect to the voltage signal corresponding to the accumulated charge of the photoelectric conversion element transferred to the output node in the transfer period after the integration period and, in the first comparison processing, starting an analog-to-digital (AD) conversion processing comparing the voltage signal of the output buffer part and the reference voltage and outputting the digitized comparison result signal with a delay from the starting time of the first comparison processing.

An electronic apparatus of a third aspect of the present invention has a solid-state imaging device and an optical system for forming a subject image in the solid-state imaging device, wherein the solid-state imaging device has a pixel part in which pixels for performing photoelectric conversion are arranged and a reading part which reads out pixel signals from the pixels in the pixel part, each of the pixels includes a photoelectric conversion element which accumulates a charge generated by photoelectric conversion in an integration period, a transfer element capable of transferring the charge accumulated in the photoelectric conversion element in a transfer period after the integration period, an output node formed by a floating diffusion to which the charge accumulated in the photoelectric conversion element is transferred through the transfer element, an output buffer part which converts the charge at the output node to a voltage signal corresponding to a quantity of the charge and outputs the converted voltage signal, and a comparator which performs comparison processing comparing the voltage signal of the output buffer part and a reference voltage and outputting the digitized comparison result signal, and the comparator, under the control of the reading part, performs a first comparison processing outputting a digitized first comparison result signal with respect to the voltage signal corresponding to an overflow charge overflowing from the photoelectric conversion element to the output node in the integration period and a second comparison processing outputting a digitized second comparison result signal with respect to the voltage signal corresponding to the accumulated charge of the photoelectric conversion element transferred to the output node in the transfer period after the integration period and, in the first comparison processing, starts an analog-to-digital (AD) conversion processing comparing the voltage signal of the output buffer part and the reference voltage and outputting the digitized comparison result signal with a delay from the starting time of the first comparison processing.

Advantageous Effects of Invention

According to the present invention, it is possible to lower the power consumption, it is possible to suppress the influence of the dark current of a floating diffusion as an output node, and it is possible to suppress deterioration of the image while substantially realizing a broader dynamic range and a higher frame rate. Further, according to the present invention, it is possible to lower the power consumption, it is possible to suppress the influence of the dark current of a floating diffusion as an output node, it is possible to suppress deterioration of the image while substantially realizing a broader dynamic range and a higher frame rate, and, in addition, it is possible to lower noise and expand the effective pixel region to the maximum limit and possible to raise the value relative to the cost to the maximum limit.

BRIEF DESCRIPTION OF DRAWINGS

FIG. 14A and FIG. 14B are views for explaining an operation according to the AD conversion processing method in the first comparison processing period for lowering a power consumption and suppressing the influence of the dark current of the floating diffusion and views for explaining an operation where a photodiode causes overflowing.

FIG. 15A and FIG. 15B are views for explaining the operation according to the AD conversion processing method in the first comparison processing period for lowering a power consumption and suppressing the influence of the dark current of the floating diffusion and views for explaining an operation where a photodiode does not cause overflowing.

FIG. 16A and FIG. 16B are schematic views for explaining a stacked structure of the solid-state imaging device according to the first embodiment.

FIG. 26 is a table showing results of simulation of the broader dynamic range etc. according to the AD conversion processing in the time stamp ADC according to the embodiment as shown in FIG. 13.

DESCRIPTION OF EMBODIMENTS

Figure 1:
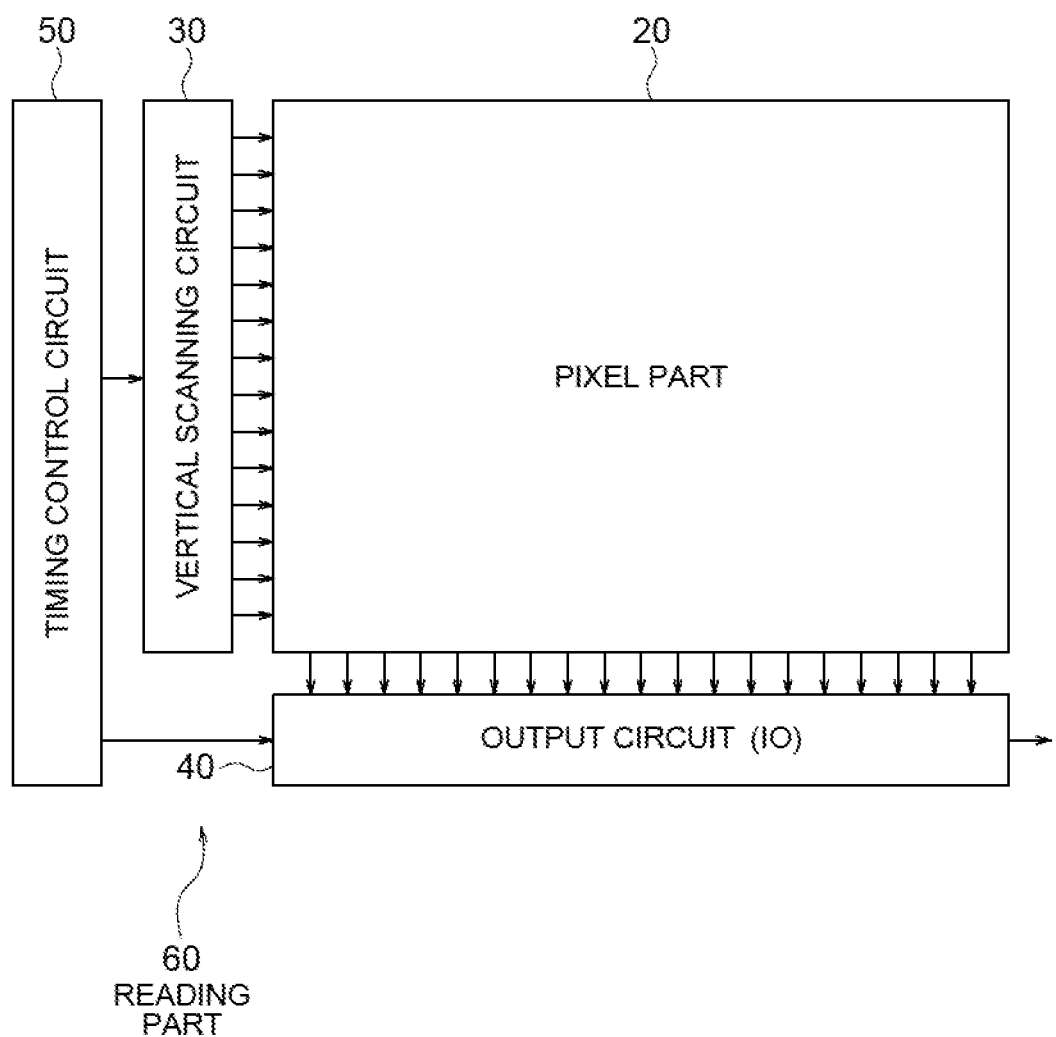
FIG. 1 is a block diagram showing an example of the configuration of a solid-state imaging device according to a first embodiment of the present invention.

Embodiments of the present invention will be hereinafter explained with reference to the drawings First Embodiment FIG. 1 is a block diagram showing an example of the configuration of a solid-state imaging device according to a first embodiment of the present invention. In the present embodiment, a solid-state imaging device 10 is constituted by for example a CMOS image sensor including digital pixels as the pixels.

As shown in FIG. 1, the solid-state imaging device 10 is constituted mainly by an image capturing part constituted by a pixel part 20, a vertical scanning circuit (row scanning circuit) 30, an output circuit 40, and a timing control circuit 50. Among these components, for example, the vertical scanning circuit 30, the output circuit 40, and the timing control circuit 50 constitute the reading part 60 for reading out pixel signals.

In the first embodiment, the solid-state imaging device 10 is configured as for example a stacked type CMOS image sensor which, in the pixel part 20, includes digital pixels comprised of photoelectric converting and reading parts, AD (analog-to-digital) conversion parts, and memory parts and has a global shutter operation function. In the solid-state imaging device 10 according to the first embodiment, as will be explained in detail later, each digital pixel DP has an AD conversion function, while the AD conversion part has a comparator performing comparison processing for comparing a voltage signal read out by the photoelectric converting and reading part and a reference voltage and outputting a digitized comparison result signal. The comparator, under the control of the reading part 60, performs a first comparison processing for outputting a digitized first comparison result signal with respect to a voltage signal corresponding to an overflow charge overflowing from the photoelectric conversion element to the output node (floating diffusion) in an integration period and a second comparison processing for outputting a digitized second comparison result signal with respect to a voltage signal corresponding to the accumulated charge of the photoelectric conversion element transferred to the output node in a transfer period after the integration period.

Further, in the first embodiment, in the first comparison processing, an analog-to-digital (AD) conversion processing for comparing the voltage signal of the output buffer part and the reference voltage and outputting the digitized comparison result signal is started with a delay from the starting time of the first comparison processing. Further, the output buffer part (source follower element) and the comparator are supplied with bias currents to enter a driven state. However, the supply of the bias currents is stopped (the bias currents are saved) during a predetermined period from the start of the first comparison processing to the start of the AD conversion processing. Further, the output node is reset during the predetermined period from the start of the first comparison processing to the start of the AD conversion processing. The reading part 60, at the time of the start of the AD conversion processing, resets at least the output node to the reset level, and then performs the AD conversion processing for comparing the voltage signal of the output buffer part and the reference voltage. More specifically, the reading part 60, at the starting time of the AD conversion processing, performs the AD conversion processing for comparing the voltage signal of the output buffer part and the ramp shaped reference voltage from the time of resetting of at least the output node to the reset level up to the end of the first comparison processing period. The AD conversion processing in the first comparison processing period and the like will be explained in detail later.

Below, an outline of the configurations and functions of the parts in the solid-state imaging device 10, particularly the configurations and functions of the pixel part 20 and digital pixels, the read-out processing concerned with them, the stacked structure of the pixel part 20 and the reading part 60, and the AD conversion processing etc. in the first comparison processing period will be explained in detail.

Configurations of Pixel Part 20 and Digital Pixels 200

Figure 2:
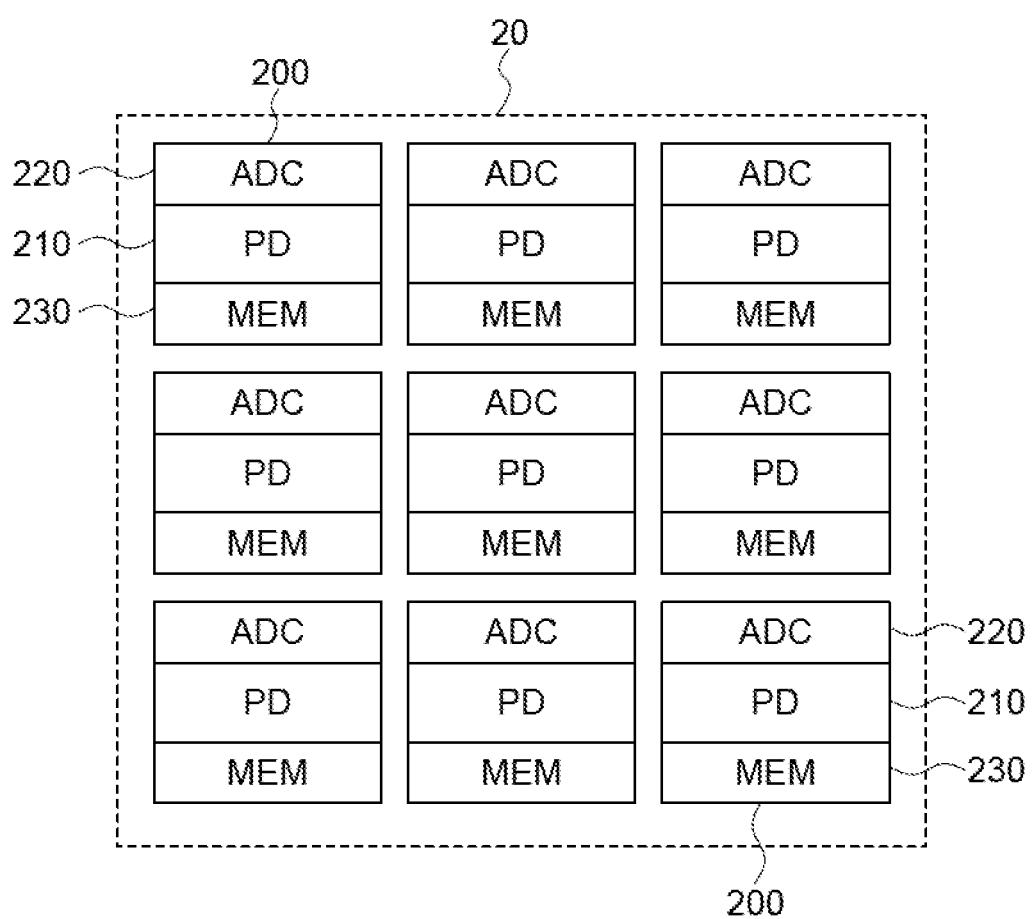
FIG. 2 is a view showing an example of a digital pixel array of a pixel part in the solid-state imaging device according to the first embodiment of the present invention.
Figure 3:
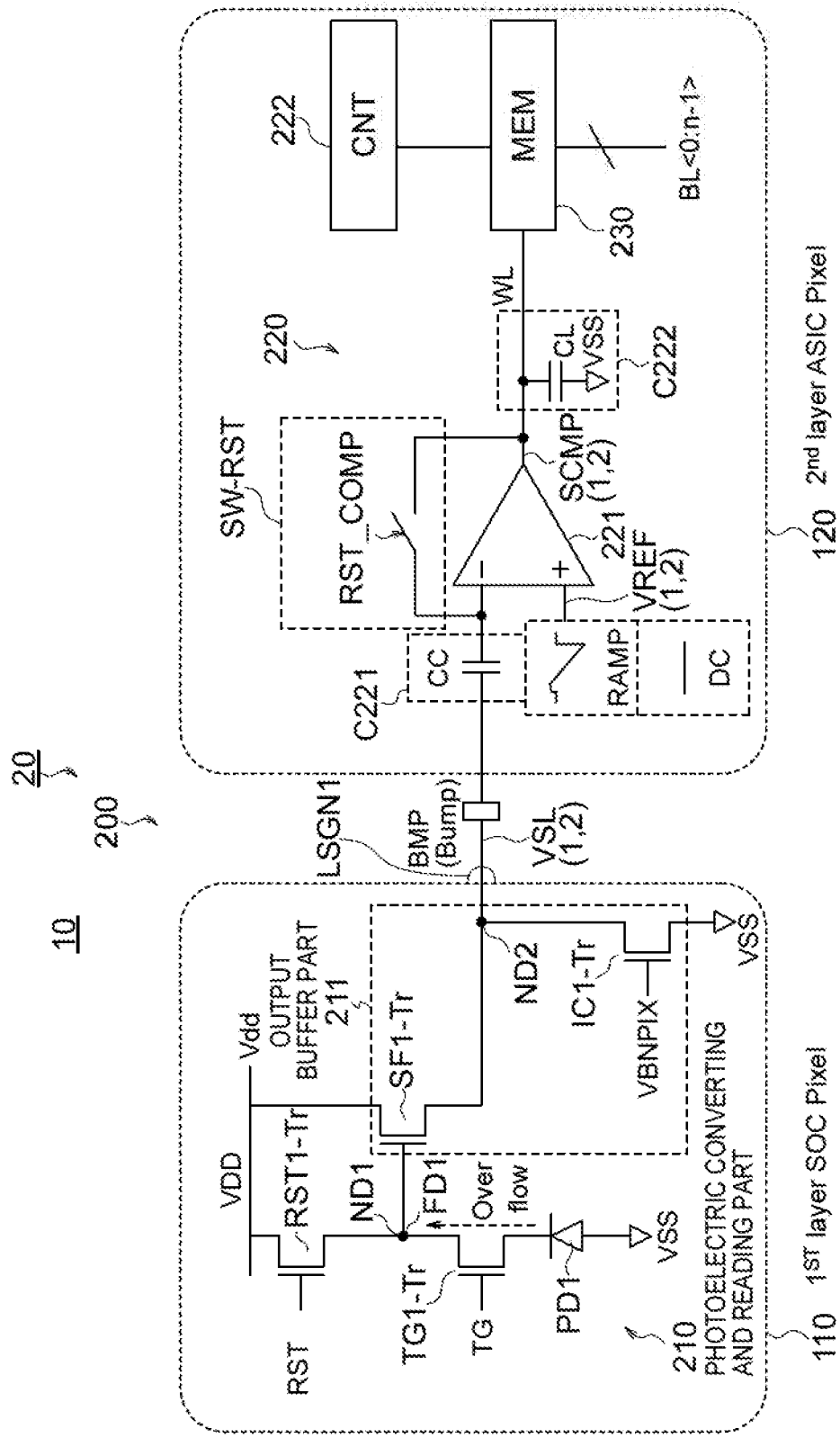
FIG. 3 is a circuit diagram showing an example of a pixel in the solid-state imaging device according to the first embodiment of the present invention.

FIG. 2 is a view showing an example of a digital pixel array in a pixel part of the solid-state imaging device 10 according to the first embodiment of the present invention. FIG. 3 is a circuit diagram showing an example of a pixel of the solid-state imaging device 10 according to the first embodiment of the present invention.

In the pixel part 20, as shown in FIG. 2, a plurality of digital pixels 200 are arranged in a matrix comprised of N rows and M columns. Note that, for simplification of the drawing, FIG. 2 shows an example in which nine digital pixels 200 are arranged in a matrix comprised of 3 rows and 3 columns (matrix where M=3 and N=3).

The digital pixel 200 according to the first embodiment is includes a photoelectric converting and reading part (denoted as PD in FIG. 2) 210, an AD conversion part (denoted as ADC in FIG. 2) 220, and a memory part (denoted as MEM in FIG. 2) 230. The pixel part 20 in the first embodiment, as will be explained in detail later, is configured as a laminated CMOS image sensor constituted by a first substrate 110 and a second substrate 120. In the present example, as shown in FIG. 3, the photoelectric converting and reading part 210 is formed on the first substrate 110, and the AD conversion part 220 and the memory part 230 are formed on the second substrate 120.

The photoelectric converting and reading part 210 in the digital pixel 200 includes a photodiode (photoelectric conversion element) and an in-pixel amplifier. Specifically, this photoelectric converting and reading part 210 has for example a photodiode PD1 as a photoelectric conversion element. This photodiode PD1 has one each of a transfer transistor TG1-Tr as a transfer element, a reset transistor RST1-Tr as a reset element, a source follower transistor SF1-Tr as a source follower element, a current transistor IC1-Tr as a current source element, a floating diffusion FD1 as an output node ND1, and a read-out node ND2. In this way, the photoelectric converting and reading part 210 in the digital pixel 200 according to the first embodiment includes the four transistors (4Tr) of the transfer transistor TG1-Tr, the reset transistor RST1-Tr, the source follower transistor SF1-Tr, and the current transistor IC1-Tr.

Further, in the first embodiment, an output buffer part 211 includes the source follower transistor SF1-Tr, the current transistor IC1-Tr, and the read-out node ND2.

In the photoelectric converting and reading part 210 according to the first embodiment, the read-out node ND2 of the output buffer part 211 is connected to the input part of the AD conversion part 220. The photoelectric converting and reading part 210 converts the charge in the floating diffusion FD1 as the output node to a voltage signal corresponding to the quantity of charge and outputs the converted voltage signal VSL to the AD conversion part 220.

More specifically, in the first comparison processing period PCMPR1 of the AD conversion part 220, the photoelectric converting and reading part 210 outputs the voltage signal VSL corresponding to the overflow charge overflowing from the photodiode PD1 as the photoelectric conversion element to the floating diffusion FD1 as the output node in the integration period PI.

Further, in the second comparison processing period PCMPR2 of the AD conversion part 220, the photoelectric converting and reading part 210 outputs the voltage signal VSL corresponding to the accumulated charge of the photodiode PD1 transferred to the floating diffusion FD1 as the output node in the transfer period PT after the integration period PI. In the second comparison processing period PCMPR2, the photoelectric converting and reading part 210 outputs the read-out reset signal (signal voltage) (VRST) and read-out signal (signal voltage) (VSIG) as the pixel signals to the AD conversion part 220.

The photodiode PD1 generates a signal charge (here, electrons) in an amount in accordance with the quantity of the incident light and accumulates the same. Below, an explanation will be given of a case where the signal charge is electrons and each transistor is an n-type transistor. However, the signal charge may be positive holes (holes) or each transistor may be a p-type transistor as well. Further, the present embodiment is effective also in a case where each transistor is shared among a plurality of photodiodes and transfer transistors.

In each digital pixel 200, the photodiode (PD) is constituted by a pinned photodiode (PPD). On the substrate surface for forming the photodiode (PD), there is a surface level due to dangling bonds or other defects, therefore a lot of charges (dark current) are generated due to heat energy, so a correct signal fails to be read out. In a pinned photodiode (PPD), the charge accumulation part of the photodiode (PD) is pinned in the substrate, so it becomes possible to reduce mixing dark current into the signal.

The transfer transistor TG1-Tr in the photoelectric converting and reading part 210 is connected between the photodiode PD1 and the floating diffusion FD1 and is controlled by a control signal TG applied through a control line to the gate. The transfer transistor TG1-Tr is selected and enters a conductive state in the transfer period PT in which the control signal TG is at a high (H) level. It transfers the charge (electrons) which is photo-electrically converted and accumulated in the photodiode PD1 to the floating diffusion FD1. Note that, after the photodiode PD1 and floating diffusion FD1 are reset to the predetermined reset potentials, the transfer transistor TG1-Tr enters a non-conductive state in which the control signal TG is at a low (L) level, and the photodiode PD1 enters into the integration period PI. However, at this time, if the intensity (quantity) of the incident light is very high, the charge exceeding the saturated charge amount overflows to the floating diffusion FD1 as the overflew charge through the overflow path under the transfer transistor TG1-Tr.

The reset transistor RST1-Tr is connected between the power supply line Vdd of the power supply voltage VDD and the floating diffusion FD1 and is controlled by the control signal RST supplied through the control line to the gate. The reset transistor RST1-Tr is selected and enters a conductive state in the reset period in which the control signal RST is at the H level and resets the floating diffusion FD1 to the potential of the power supply line Vdd of the power supply voltage VDD.

The source follower transistor SF1 as the source follower element is connected at the source to the read-out node ND2, is connected at the drain side to the power supply line Vdd, and is connected at the gate to the floating diffusion FD1. The drain and source of the current transistor IC1-Tr as the current source element are connected between the read-out node ND2 and the reference potential VSS (for example GND). The gate of the current transistor IC1-Tr is connected to a supply line of a control signal VENPIX. Further, a signal line LSGN1 between the read-out node ND2 and the input part of the AD conversion part 220 is driven by the current transistor IC1-Tr as the current source element.

Figure 4:
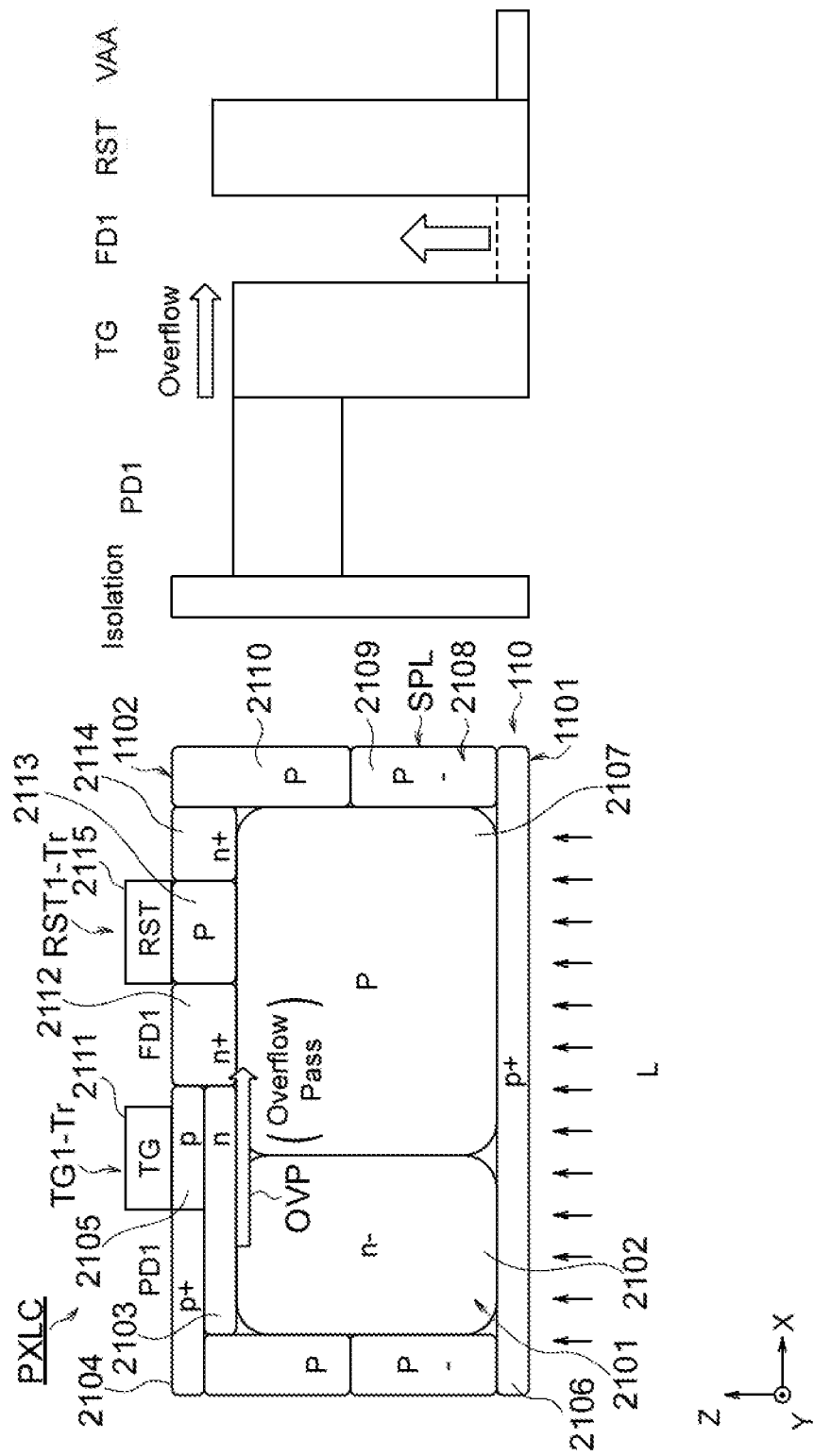
FIG. 4A and FIG. 4B are simple cross-sectional views showing an example of the configuration of a principal part of the digital pixel according to the first embodiment of the present invention, that is, a charge integration and transfer system, and a potential diagram at the time of overflowing.

FIG. 4A and FIG. 4B are a schematic cross-sectional view showing an example of the configuration of the principal part of a digital pixel according to the first embodiment of the present invention, that is, the charge integration and transfer system, and a potential diagram at the time of overflowing.

Each digital pixel cell PXLC is formed on a semiconductor substrate (first substrate 110 in the present example) having a first substrate surface 1101 side to which the light L is irradiated (for example back surface side) and a second substrate surface 1102 side opposite to the first substrate surface 1101 side and is separated by separation layers SPL. Further, the digital pixel cell PLXC in FIG. 4A includes parts forming the photoelectric converting and reading part 210 such as the photodiode PD1, the transfer transistor TG1-Tr, the floating diffusion FD1, the reset transistor RST1-Tr, the separation layers SPL, and further a color filter part and a micro-lens (not shown).

Configuration of Photodiode

The photodiode PD1 includes a semiconductor layer (n-layer in the present embodiment) 2101 of a first conductivity type (n-type in the present embodiment) formed so as to be pinned in the semiconductor substrate having the first substrate surface 1101 side and the second substrate surface 1102 side on the side opposite to the first substrate surface 1101 side and is formed so as to have a photoelectric conversion function of the received light and charge accumulation function. In the side portions of the photodiode PD1 in a direction (X-direction in an orthogonal coordinate system in the drawing) perpendicular to the normal line of the substrate, second conductivity type (p-type in the present embodiment) separation layers SPL are formed.

In this way, in the present embodiment, in each digital pixel cell PXLC, the photodiode (PD) is constituted by a pinned photodiode (PPD). On the substrate surface for forming the photodiode (PD), there is a surface level due to dangling bonds or another defects, therefore a lot of charges (dark current) are generated due to heat energy, so a correct signal fails to be read out. In a pinned photodiode (PPD), the charge accumulation part of the photodiode (PD) is pinned in the substrate, so it is possible to reduce mixing the dark current into the signal.

In the photodiode PD1 in FIG. 4A, the n-layer (first conductivity type semiconductor layer) 2101 is configured so as to have a two-layer structure in the normal line direction of the substrate 110 (Z-direction in the orthogonal coordinate system in the drawing). In the present example, an $n^-$-layer 2102 is formed on the first substrate surface 1101 side, an n-layer 2103 is formed on the second substrate surface 1102 side of the $n^-$-layer 2102, and a $p^+$-layer 2104 and a p-layer 2105 are formed on the second substrate surface 1102 side of the n-layer 2103. Further, a $p^+$-layer 2106 is formed on the first substrate surface 1101 side of the $n^-$-layer 2102. The $p^+$-layer 2106 is formed uniformly covering not oily the photodiode PD1, but also the separation layers SPL and further other digital pixel cells PXLC.

Note that, on the light incident side of the $p^+$-layer 2106, a color filter part is formed. Further, a micro-lens is formed on the light incident side of the color filter part so as to correspond to a portion of the photodiode PD1 and separation layers SPL.

These configurations are one example. The structure may be a single layer structure or may be a three-layer, four-layer, or higher stacked structure.

Configuration of Separation Layers in X-Direction (Column Direction) In a p-type separation layer SPL in the X-direction (column direction) in FIG. 4A, a first p-layer (second conductivity type semiconductor layer) 2107 is formed on the side contacting the $n^-$-layer 2102 of the photodiode PD1 and at the right side part in the direction (X-direction in the orthogonal coordinate system in the drawing) perpendicular to the normal line of the substrate. Further, in a p-type separation layer SPL, on the right side in the X-direction of the first p-layer 2107, a second p-layer (second conductivity type semiconductor layer) 2108 is formed so as to give a two-layer structure in the normal line direction of the substrate 110 (Z-direction in the orthogonal coordinate system in the drawing). In the present example, in the second p-layer 2108, a p⁻-layer 2109 is formed on the first substrate surface 1101 side, while a p-layer 2110 is formed on the second substrate surface 1102 side of this p⁻-layer 2109.

These configurations are one example. The structure may be a single layer structure or may be a three-layer, four-layer, or higher stacked structure.

On the first substrate surface 1101 side of the first p-layer 2107 and the second p⁻-layer 2109 in the p-type separation layer SPL, a p⁺-layer 2106 the same as the photodiode PD1 is formed.

An n-layer 2103 is formed so as to extend so that an overflow path OVP is formed covering a portion on the second substrate surface 1102 side of the first p-layer 2107 in the p-type separation layer SPL. Further, on the p-layer 2105 on the second substrate surface 1102 side of the n-layer 2103, a gate electrode 2111 of the transfer transistor TG1-Tr is formed through a gate insulation film. Further, on the second substrate surface 1102 side of the first p-layer 2107 in the p-type separation layer SPL, an n⁺-layer 2112 for forming the floating diffusion FD1 is formed. A p-layer 2113 for forming the channel-forming region of the reset transistor RST1-Tr is formed adjacent to the n⁺-layer 2112 while an n⁺-layer 2114 is formed adjacent to the p-layer 2113. Further, on the p-layer 2113, a gate electrode 2115 is formed through a gate insulation film.

In such a structure, if the intensity (quantity) of the incident light is very high, a charge exceeding the saturated charge amount overflows as the overflow charge to the floating diffusion FD1 through the overflew path OVP under the transfer transistor TG1-Tr.

The AD conversion part 220 in the digital pixel 200 has a function of comparing the analog voltage signal VSL output by the photoelectric converting and reading part 210 with a reference voltage VREF of a ramp waveform changed with a predetermined inclination or of a fixed voltage and converting the result to a digital signal.

The AD conversion part 220, as shown in FIG. 3, includes a comparator (COMP) 221, a counter (CNT) 222, an input side coupling capacitor C221, an output side load capacitor C222, and a reset switch SW-RST.

In the comparator 221, the inverted input terminal (−) as the first input terminal is supplied with the voltage signal VSL which was output from the output buffer part 211 of the photoelectric converting and reading part 210 to the signal line LSGN1, while the non-inverted input terminal (+) as the second input terminal is supplied with the reference voltage VREF. The comparator performs comparison processing for comparing the voltage signal VST and the reference voltage VREF and outputting the digitized comparison result signal SCMP.

In the comparator 221, the coupling capacitor C221 is connected to the inverted input terminal (−) as the first input terminal. By AC-coupling of the output buffer part 211 of the photoelectric converting and reading part 210 on the first substrate 110 side and the input part of the comparator 221 in the AD conversion part 220 on the second substrate 120 side, it is possible to lower noise and to realize a high SNR at the time of low light.

Further, in the comparator 221, the reset switch SW-RST is connected between the output terminal and the inverted input terminal (−) as the first input terminal, while the load capacitor C222 is connected between the output terminal and the reference potential VSS.

Basically, in the AD conversion part 220, the analog signal (potential VSL) read out from the output buffer part 211 of the photoelectric converting and reading part 210 to the signal line LSGN1 is compared in the comparator 221 with the reference voltage VREF, for example, a ramp signal RAMP with a slope waveform linearly or non-linearly changing with a certain inclination. At this time, a counter 222 which is arranged for each column in the same way as the comparator 221 is operating. Therefore, by the ramp signal RAMP with the ramp waveform and the counter value changing in one-to-one correspondence, the voltage signal VSL is converted to a digital signal. Basically, in the AD conversion part 220, the change of the reference voltage VREF (for example ramp signal RAMP) is conversion of a change of voltage to a change of time. By counting that time in certain cycle (clock), it is converted to a digital value. Further, where the analog signal VSL and the ramp signal RAMP (reference voltage VREF) cross, the output of the comparator 221 inverts and the input clock of the counter 222 is stopped or the clock stopped being input is input to the counter 222. The value (data) of the counter 222 at that time is stored in the memory part 230 to thereby complete the AD conversion. After the end of the above AD conversion period, the data (signed) stored in the memory part 230 in each digital pixel 200 is output from the output circuit 40 to a not shown signal processing circuit, whereupon a two-dimensional image is generated by predetermined signal processing.

Basic First Comparison Processing and Second Comparison Processing in Comparator 221

Further, the comparator 221 in the AD conversion part 220 in the first embodiment is controlled in drive by the reading part 60 so as to perform the following two processings, i.e., the first comparison processing and the second comparison processing, in the reading period of pixel signals.

In the first comparison processing CMPR1, under the control of the reading part 60, the comparator 221 outputs a digitized first comparison result signal SCMP1 with respect to a voltage signal VSL1 corresponding to the overflow charge overflowing from the photodiode PD1 as the photoelectric conversion element to the floating diffusion FD1 as the output node in the integration period PI. Note that, the operation of this first comparison processing CMPR1 is also referred to as a "time stamp (TS) ADC mode operation".

In the second comparison processing CMPR2, under the control of the reading part 60, the comparator 221 outputs a digitized second comparison result signal SCMP2 with respect to a voltage signal VSL2 (VSIG) corresponding to the accumulated charge of the photodiode PD1 transferred to the floating diffusion FD1 as the output node in the transfer period PT after the integration period PI. In actuality, in the second comparison processing CMPR2, before the voltage signal VSL2 (VSIG) corresponding to the accumulated charge is digitized, the voltage signal VSL2 (VRRT) corresponding to the reset voltage of the floating diffusion FD1 at the time of resetting is digitized. Note that, the operation of this second comparison processing CMPR2 is also referred to as a "linear (Lin) ADC mode operation".

Note that, in the present embodiment, basically the integration period PI is the period from when the photodiode PD1 and floating diffusion FD1 are reset to the reset level to when the transfer transistor TG1-Tr is switched to a conductive state and the transfer period PT is started. The period PCMPR1 of the first comparison processing CMPR1 is the period after the start of resetting of the photodiode PD1 and floating diffusion FD1 to the reset level up to when the floating diffusion FD1 is reset to the reset level before the start of the transfer period PT. The period PCMPR2 of the second comparison processing CMPR2 is the period after the reset of the floating diffusion FD1 to the reset level and is the period including the transfer period PT and following period.

Figure 5:
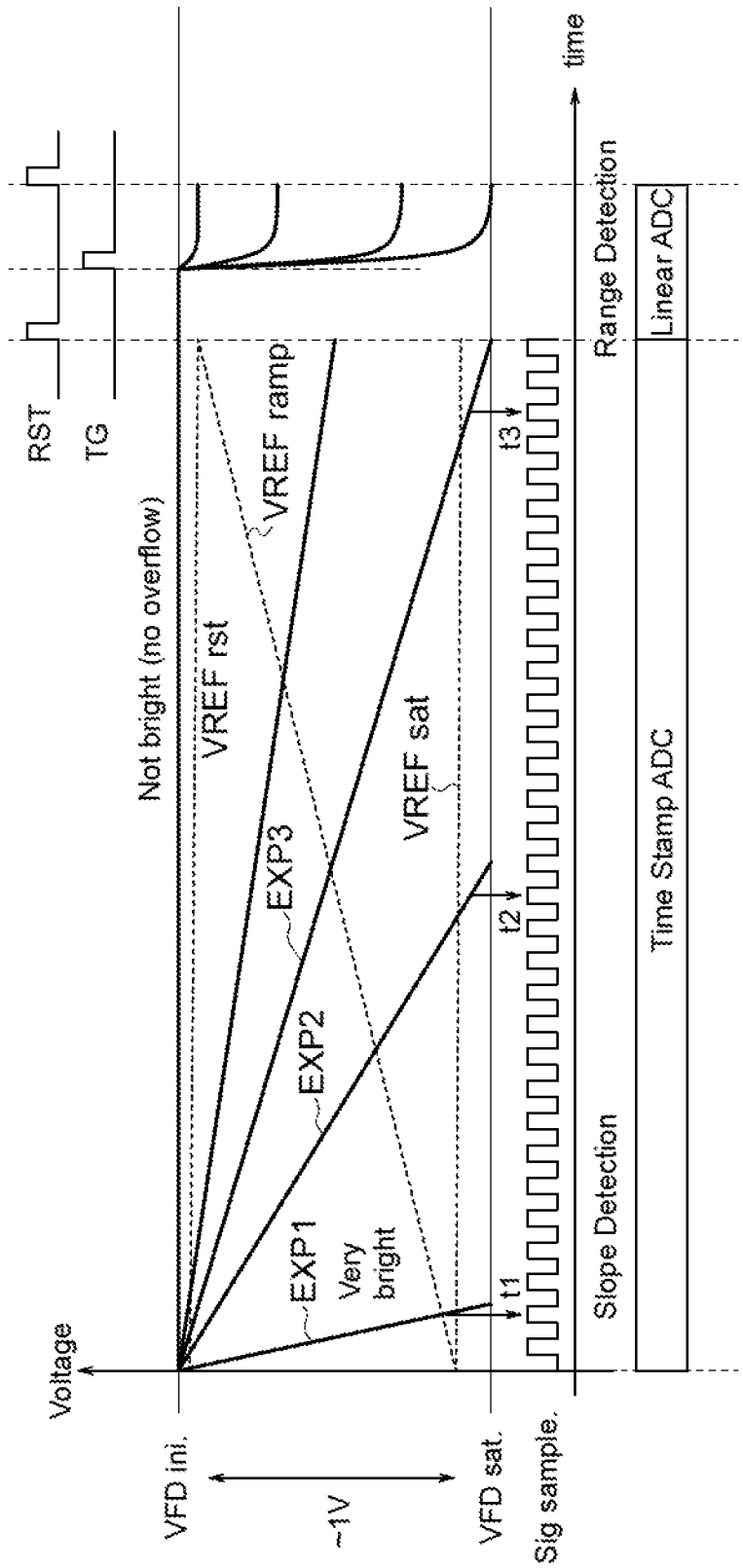
FIG. 5 is a view for explaining a basic first comparison processing of a comparator according to the embodiment.

Here, the basic first comparison processing CMPR1 will be further explained in detail. FIG. 5 is a view for explaining the basic first comparison processing CMPR1 of the comparator 221 according to the present embodiment. In FIG. 5, an abscissa indicates the time, and an ordinate indicates the voltage level VFD of the floating diffusion FD1 as the output node.

Looking at the voltage level VFD of the floating diffusion FD1, at the time of the reset level, the quantity of charge is the smallest and the voltage level VFD becomes the highest level VFDini. On the other hand, at the time of the saturation state, the quantity of charge is the largest and the voltage level VFD becomes a low level VFDsat. According to such conditions, the reference voltage VREF1 of the comparator 221 is set to a voltage VREFsat which is fixed to the level at the time of the non-saturation state before the saturation state or is set to a ramp voltage VREFramp changing from a voltage level VREFrst at the time of reset level up to the voltage level VREFsat.

If such a reference voltage VREF1 set at VREFsat or VREFramp at the time of the first comparison processing CMPR1, as shown in FIG. 5, at the time of high light when the intensity of the incident light is high, the quantity of charge is larger, therefore the time of flipping (inversion) of the output of the comparator 221 is fast. In a case of example EXP1 of the highest light, the output of the comparator 221 immediately flips (inverts) at the time t1. In a case of example EXP2 of light lower than that in example EXP1, the output of the comparator 221 flips (inverts) at the time t2 later than the time t1. In a case of example EXP3 of a light lower than that in example EXP2, the output of the comparator 221 flips (inverts) at the time t3 later than the time t2.

In this way, in the first comparison processing CMPR1, the comparator 221 outputs the first comparison result signal SCMP1 with respect to the time corresponding to the quantity of overflew charge from the photodiode PD1 to the floating diffusion FD1 for a predetermined time period in the integration period PI.

More specifically, in the first comparison processing CMPR1, the comparator 221 can handle comparison processing with a light level from a signal level corresponding to a predetermined threshold value of the photodiode PD1 at the maximum sampling time at which the overflow charge begins to overflow from the photodiode PD1 to the floating diffusion FD1 as the output node to the signal level obtained at the minimum sampling time.

As explained above, the photo conversion operation in the time stamp ADC mode is executed in the integration period PI accompanied by light-to-time conversion. As shown in FIG. 5, under a very bright light, the output state of the comparator 221 is inverted immediately after the reset activation period, and the light level thereof corresponds to the saturation signal (well capacity) explained by the following time:

((FD saturation amount×integration time)/sampling period)+PD saturation amount

For example, assume that FD saturation: 8 Ke@150 uV/e to 1.1 fF of FD capacity, minimum sampling time: 15 nsec, and integration time: 3 msec.

In this time stamp ADC operation mode, as explained above, it is possible to cover the light level from a signal level corresponding to the predetermined threshold value of the photodiode PD1 at the maximum sampling time at which the overflow charge begins to overflew from the photodiode PD1 to the floating diffusion FD1 as the output node to a signal level obtained at the minimum sampling time.

Figure 6:
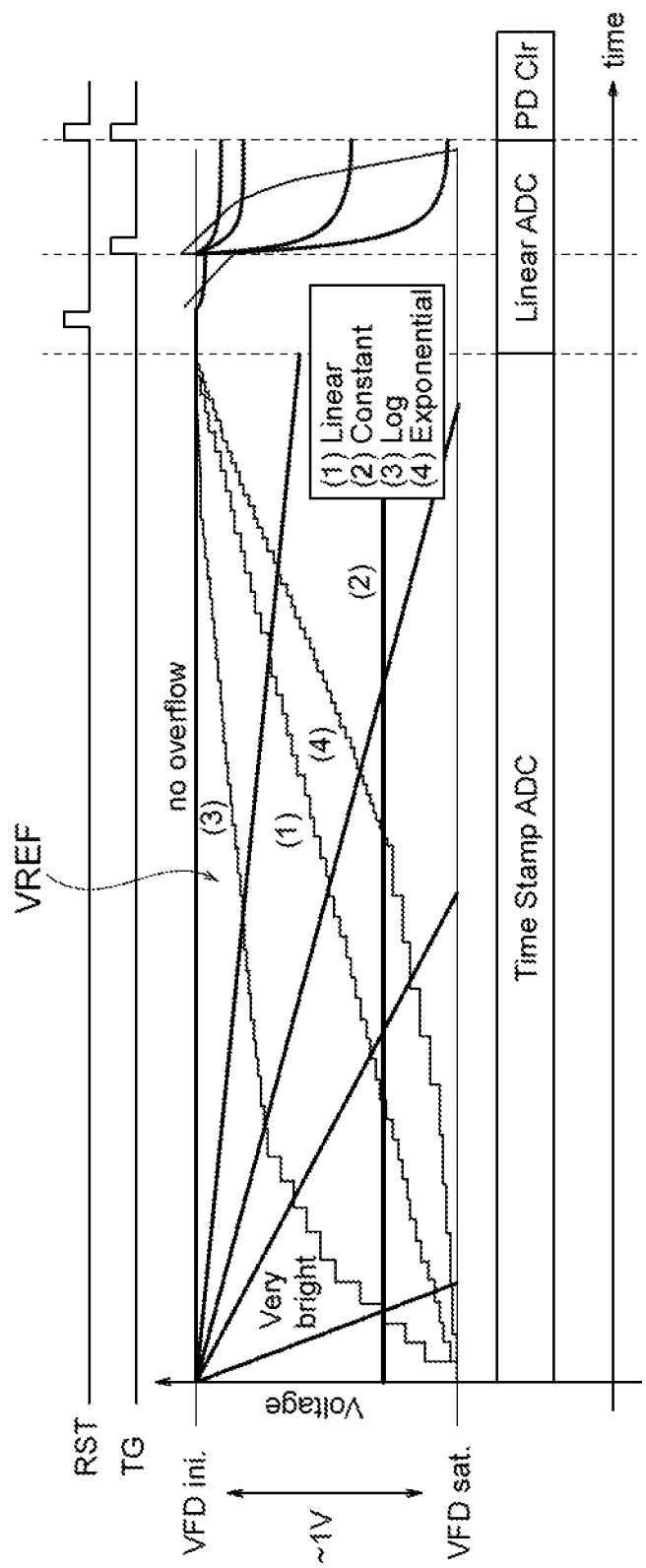
FIG. 6 is a view for explaining the basic first comparison processing of the comparator according to the embodiment, and for explaining an example of another pattern of a reference voltage.

FIG. 6 is a view for explaining the basic first comparison processing CMPR1 of the comparator 221 according to the present embodiment and explaining an example of another pattern of the reference voltage.

The reference voltage VREF may be a ramp waveform (signal) RAMP changing with a predetermined inclination as indicated by (1) in FIG. 6 or a fixed voltage DC indicated by (2) in FIG. 6 as well. Further, it may be a log indicated by (3) in FIG. 6 or a voltage signal taking an exponential value indicated by (4) in FIG. 6 as well.

Figure 7:
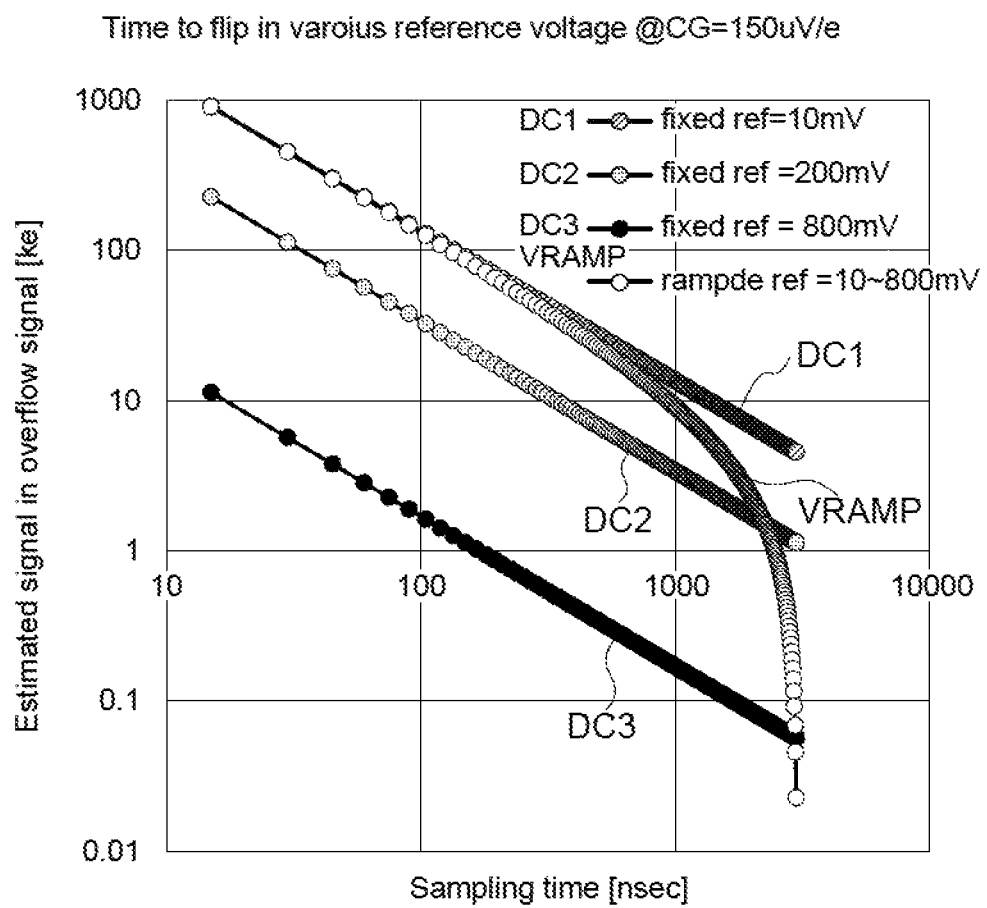
FIG. 7 is a view showing states of light-to-time conversion where various reference voltages are input to the comparator according to the embodiment.

FIG. 7 is a view showing states of light-to-time conversion where various reference voltages VREF are input to the comparator according to the present embodiment. In FIG. 7, an abscissa indicates the sampling time, and an ordinate indicates the estimated signal in the overflow signal.

FIG. 7 shows a sampling time at which the comparator 221 inverts which corresponds to the overflow charge (signed) according to the nature (suitability) of the light applied. FIG. 7 shows the sampling time which inverts for a variety of fixed reference voltages DC1, DC2, and D3 and the ramp reference voltage VRAMP. Here, use is made of a linear reference ramp.

When the operation of the time stamp ADC mode for performing the first comparison processing CMPR1 with respect to the saturated overflow charge as described above ends, after resetting the floating diffusion FD1 and comparator 221, the processing shifts to the operation of the linear ADC mode for performing the second comparison processing CMPR2 with respect to the non-saturated charge.

Figure 8:
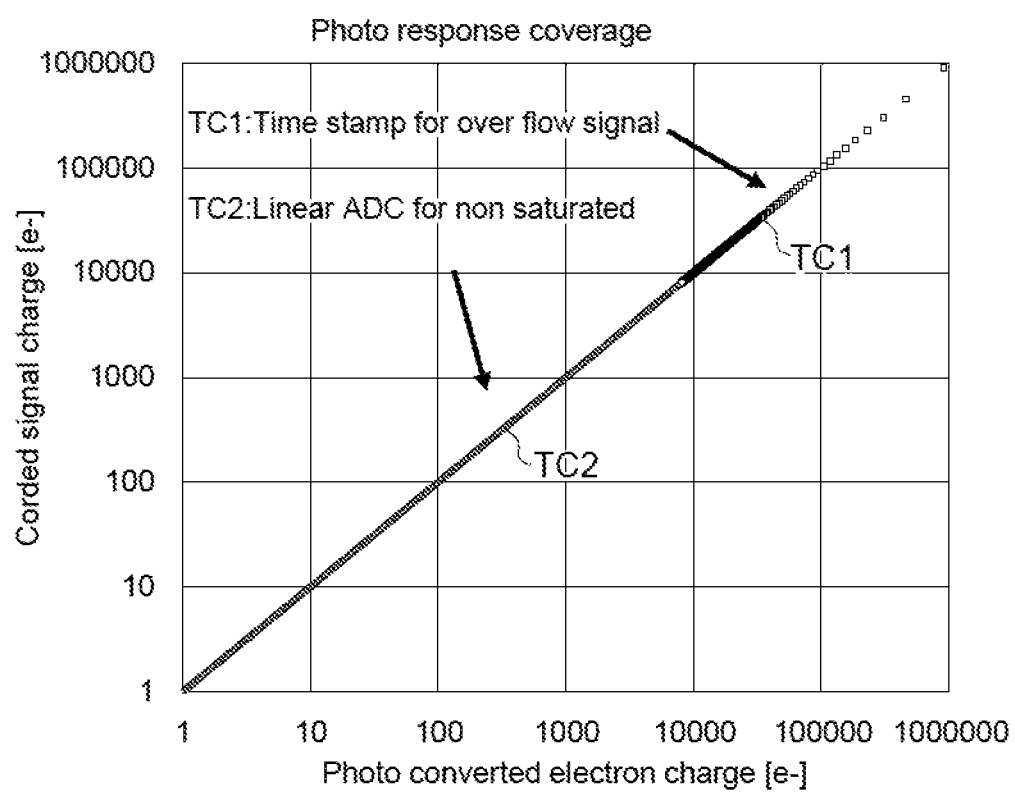
FIG. 8 is a view showing a light response coverage in the digital pixel according to the first embodiment of the present invention.

FIG. 8 is a view showing a photo response coverage in the digital pixel according to the first embodiment of the present invention. In FIG. 8, TC1 indicates the signal (AD conversion transfer curve) according to the time stamp ADC mode operation, and TC2 indicates the signal (AD conversion transfer curve) according to the linear ADC mode operation.

The time stamp ADC mode has a photo response with respect to very bright light, therefore the linear ADC mode can have a photo response from a dark level. For example, a dynamic range performance of 120 dB can be realized. For example, as explained above, the saturation signal of the photo conversion range is 900 Ke. The linear ADC mode is a usual reading node operation to which ADC is applied, therefore can cover from a noise level of 2e up to the saturation of the photodiode PD1 and floating diffusion FD1 of 8 Ke. The coverage of the linear ADC mode can be expanded to 30 Ke by an additional switch and capacity.

FIG. 8 shows a case where the combinational processing of the first AD conversion transfer curve TC1 corresponding to the first comparison processing CMPR1 and the second AD conversion transfer curve TC2 corresponding to the second comparison processing CMPR2 is ideally carried out, so there is no joining gap at the joining part (joining region) of the two curves TC1 and TC2 and smooth switching (connection) is carried out.

In this regard, if trying to utilize the overflow charges overflowing from photodiodes in an integration period (exposure period) in real time in an CMOS image sensor provided with digital pixel sensors, in this integration period, it is necessary to make a bias current of the source follower transistor SF1-Tr as the source follower element and a bias current of the comparator 221 always active, so the power consumption is liable to become higher.

Further, in actuality, if for example trying to utilize the overflow charges overflowing from photodiodes in an integration period (exposure period) in real time in the time stamp ADC mode, even in this integration period, an inversion timing of the comparator fluctuates upon receipt of the influence of a dark current of the floating diffusion FD1 as the output node and its shot noise. For this reason, erroneous judgment of the comparator 221 and an insensitive input range are liable to occur and non-linearity is liable to occur in offset of images in the entire column, that is, fixed pattern noise (FPN), and in the AC conversion transfer curve.

Therefore, in the present embodiment, as will be explained in detail later, in the first comparison processing, the AD conversion processing comparing the voltage signal VSL of the output buffer part 211 and the reference voltage VREF and outputting the digitized comparison result signal is started with a delay from the starting time of the first comparison processing. Further, the source follower element of the output buffer part 211 and the comparator 221 are supplied with the bias currents to become driven states. However, the supply of the bias currents is stepped (saved) during the predetermined period from the start of the first comparison processing to the start of the AD conversion processing. Further, the output node ND1 is reset during the predetermined period from the start of the first comparison processing to the start of the AD conversion processing. Due to this, in the first embodiment, the power consumption is lowered, the influence of the dark current of the floating diffusion FD1 forming the output node ND1 is suppressed (removed), and deterioration of the image is suppressed while a broader dynamic range is substantially realized.

Figure 9:
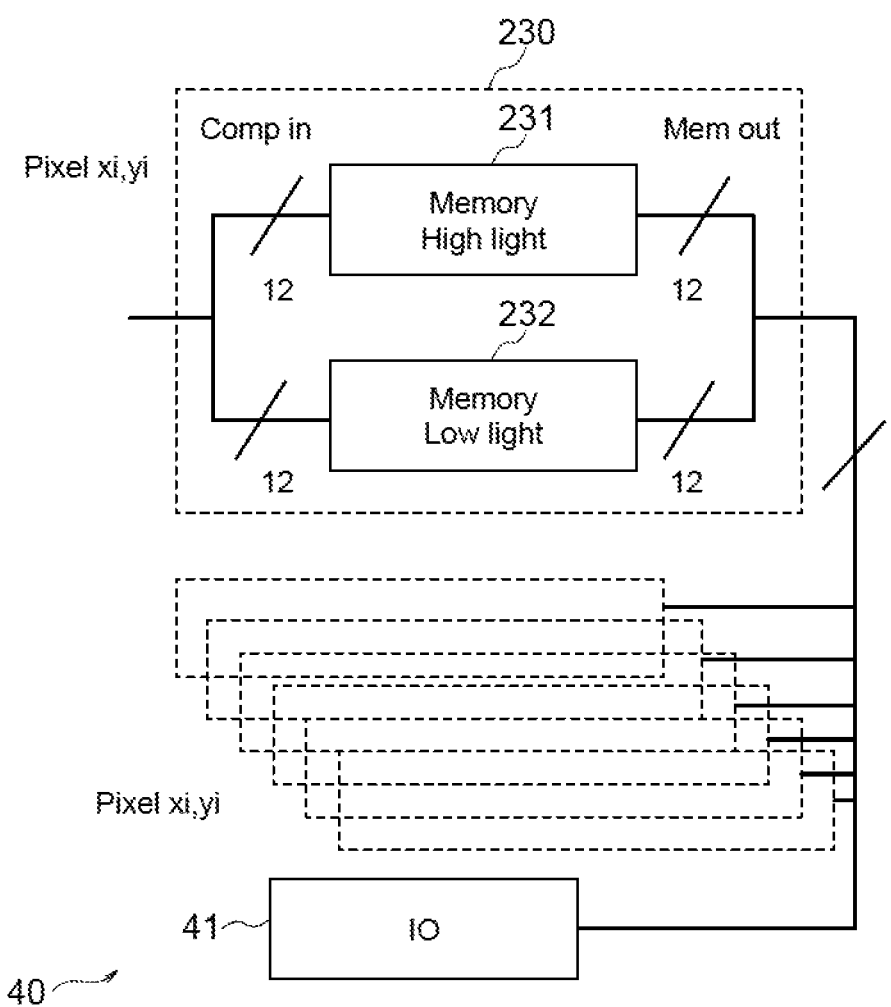
FIG. 9 is a view showing an example of configurations of a memory part and an output circuit according to the first embodiment of the present invention.

FIG. 9 is a view showing an example of the configuration of a memory part and an output circuit according to the first embodiment of the present invention.

In the comparator 221, the first comparison result signal SCMP1 obtained by digitalization of the voltage signal corresponding to the overflew charge of the floating diffusion FD1 by the first comparison processing CMPR1 and the second comparison result signal SCMP2 obtained by digitalization of the accumulated charge in the photodiode PD1 by the second comparison processing CMPR2 are stored as digital data in the memories 231 and 232 linked with each other. The memory part 230 is configured by an SRAM or DRAM, and the digital-converted signal is supplied to this. The signal corresponds to the photo conversion code and can be read out by an external IO buffer 41 of the output circuit 40 on the periphery of the pixel array.

Figure 10:
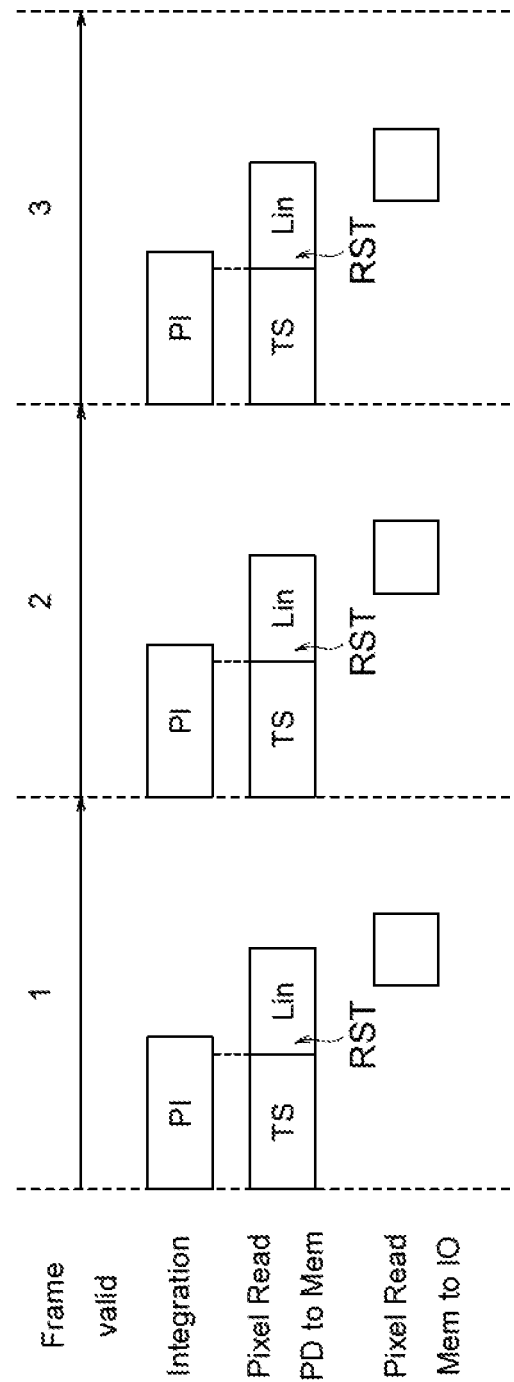
FIG. 10 is a view showing an example of a frame read out sequence in the solid-state imaging device according to the first embodiment of the present invention.

FIG. 10 is a view showing an example of the frame read out sequence in the solid-state imaging device 10 according to the first embodiment of the present invention. Here, an example of the frame read-out method in the solid-state imaging device 10 will be explained. In FIG. 10, TS indicates the processing time of the time stamp ADC, and Lin indicates the processing period of the linear ADC.

As explained above, the overflow charge is accumulated in the floating diffusion FD1 in the integration period PI. The time stamp ADC mode operates in the integration period PI. In actuality, the time stamp ADC mode operates for a period in the integration period PI up to the reset of the floating diffusion FD1. When the operation of the time stamp ADC mode ends, the operation shifts to the linear ADC mode where conversion is carried out so as to read the signal (VRST) at the time of reset of the floating diffusion FD1 and store the digital signal in the memory part 230. Further, after the end of the integration period PI, in the linear ADC mode, conversion is carried out so as to read the signal (VSIG) in accordance with the accumulated charge of the photodiode PD1 and store the digital signal in the memory part 230. The read-out frame is executed by reading the digital signal data from the memory node. It has an MIPI data format and is, for example, sent to the outside of the solid-state imaging device 10 (image sensor) through an IO buffer 41 of the output circuit 40 (FIG. 9). This operation can be globally executed with respect to the entire pixel array.

Further, in the pixel part 20, the reset transistors RST1-Tr and transfer transistors TG1-Tr are used to reset the photodiodes PD1 simultaneously for all of the pixels to thereby start the exposure for all of the pixels simultaneously and in parallel. Further, after the predetermined exposure period (integration period PI) ends, the transfer transistors TG1-Tr are used to sample the output signals from the photoelectric converting and reading parts 210 at the AD conversion parts 220 and memory parts 230 to thereby end the exposure simultaneously and in parallel for all pixels. Due to this, a global shutter operation is realized electronically.

The vertical scanning circuit 30 drives the photoelectric converting and reading parts 210 in the digital pixels 200 through the row scanning control line in the shutter rows and read rows under the control of the timing control circuit 50. Under the control of the timing control circuit 50, the vertical scanning circuit 30 supplies reference voltages VREF1 and VREF2 set according to the first comparison processing CMPR1 and second comparison processing CMPR2 to the comparators 221 in the digital pixels 200. Further, the vertical scanning circuit 30, according to the address signals, outputs the row selection signals of row addresses of the read row for reading of the signal and the shutter row for resetting the charges accumulated in the photodiodes PD1.

The output circuit 40, for example, as shown in FIG. 9, includes the IO buffer 41 arranged corresponding to the memory output of each digital pixel 200 in the pixel part 20 and outputs the digital data read out from each digital pixel 200 to the outside.

The timing control circuit 50 generates timing signals necessary for signal processing of the pixel part 20, the vertical scanning circuit 30, the h output circuit 40, and the like.

In the first embodiment, for example, at the time of the global shutter mode, the reading part 60 performs the read-out control of the pixel signals from the digital pixels 200.

AD Conversion Processing Method in First Comparison Processing Period for Lowering Power Consumption and Suppressing Influence of Dark Current of FD1

An outline of the configurations and functions of the parts in the solid-state imaging device 10, particularly the configurations and functions of the pixel part 20 and digital pixel, was explained above. Below, the AD conversion processing method etc. in the first comparison processing period for lowering the power consumption and suppressing the influence of the dark current of the floating diffusion FD1 will be explained in detail.

First, before explaining the AD conversion processing method etc. in the first comparison processing period for lowering the power consumption and suppressing the influence of the dark current, the fact that the power consumption in the basic first comparison processing be canes higher at the time of time stamp ADC mode will be considered and the influence of the dark current of the floating diffusion FD1 exerted upon the basic first comparison processing explained before at the time of the time stamp ADC mode will be considered.

In the comparator 221, the input range on the high light side is not limited by the linear fill well of the photodiode PD1, but is limited by the ADC clock frequency, therefore the time stamp ADC combined with the linear ADC can greatly increase the dynamic range of the digital pixel sensor architecture. This technique may become for example a premising global shutter technique in the near future.

However, the overflew technique is used in the time stamp ADC phase. Therefore, in this integration period (exposure period), it is necessary to make the bias current of the source follower element and the bias current of the comparator always active, so the power consumption is liable to become higher. Due to the nature of the global shutter pixels, the total current consumption becomes an individual current consumption multi-field type and is based on the number of pixels. For example, it becomes 0.1 μA/pixel×1 Mpix=100 mA. Accordingly, in particular, along with an increase of the exposure period (for example 10 ms), the power consumption of the two bias currents becomes dominant.

Further, even in a case where the exposure time (integration time) must be extended to for example 10 ms, since the floating diffusion FD1 is used in the time stamp ADC phase, erroneous judgment and occurrence an insensitive input range are liable to occur due to the dark current of the floating diffusion FD1 and its and shot noise. In particular, this is liable to become harmful if the exposure time must be made longer.

The dark current of a floating diffusion FD1 of a usual 3 μm pixel is about 300 el at 60° C. and 10 ms when the conversion gain (gain) is 200 μV/el. This is believed to correspond to 60 mVrms. This fluctuation is very large compared with the about 0.3 mVrms fluctuation of comparator reset noise.

Figure 11:
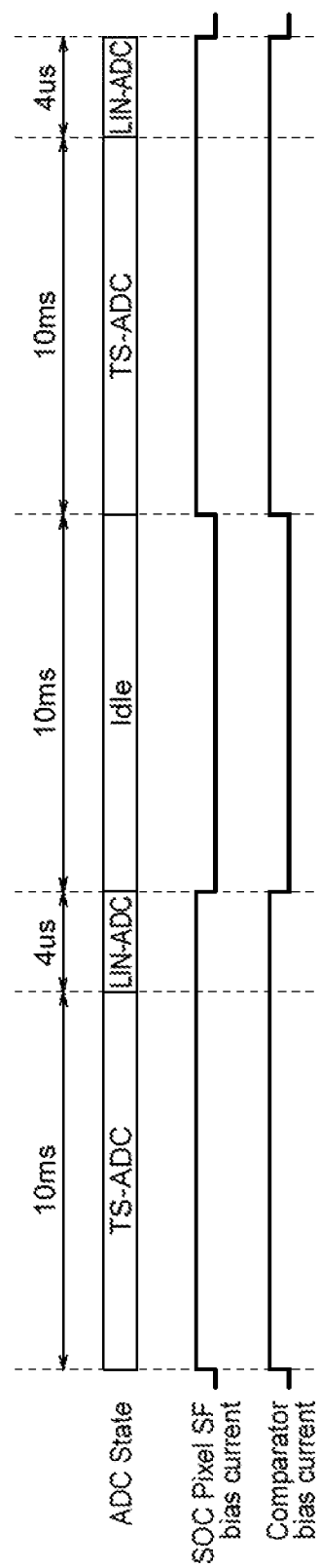
FIG. 11 is a timing chart showing the relationships between a time stamp ADC mode period (first comparison processing period) and linear ADC mode period (second comparison processing period) and a bias current of a source follower transistor and a bias current of the comparator.

FIG. 11 is a timing chart showing the relationships between the time stamp ADC mode period (first comparison processing period) and linear ADC mode period (second comparison processing period) and the bias current of the source follower transistor and the bias current of the comparator.

As shown in FIG. 11, the overflow technique is used in the time stamp ADC phase. Therefore, in this integration period (exposure period), it is necessary to make the bias current of the source follower element and the bias current of the comparator always active. Since all pixels must be made active, the total current consumption is proportional to the number of the pixel arrays and the cycle of the time stamp ADC (TS-ADC). If assuming 0.1 μA for both of the bias current of the source follower (SF) element of the pixel and the bias current of the comparator 221, about 100 mA is consumed per 1M pixels in 10 ms in the time stamp ADC (TS-ADC) and in 4 μs in the linear ADC (LIN-ADC). If the number of pixels becomes 20M pixels, 2 A is consumed. However, in a case where the power consumption is irrelevant to the cycle of TS-ADC and for example 4 μs/ADC (TS-ADC) operation can be always carried out, when taking as an example 20M pixels, only 1.6 mA is consumed in average. This is smaller by 1250× in comparison with the method of making the current constantly flow during the period of the TS-ADC in the basic first comparison processing explained before.

Figure 12:
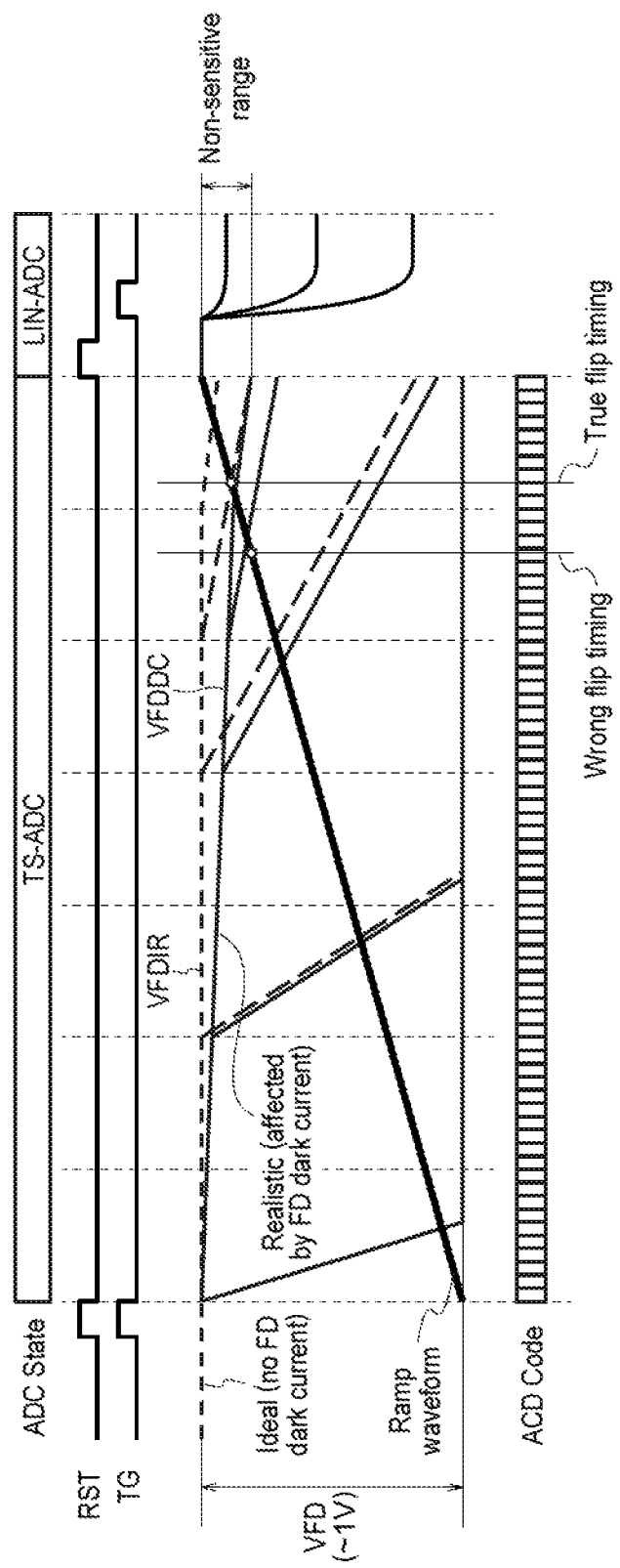
FIG. 12 is a view for explaining an influence of a dark current of a floating diffusion exerted upon the basic first comparison processing at the time of time stamp ADC mode.

FIG. 12 is a view for explaining the influence of the dark current of the floating diffusion FD1 exerted upon the basic first comparison processing explained before at the time of the time stamp ADC node.

As shown in FIG. 12, in an ideal situation where a dark current of the floating diffusion FD1 is not generated, the FD voltage VFDIR is maintained at the same level, and only the overflew charge causes a voltage drop. In actuality, however, a dark current of the floating diffusion FD1 is generated and the FD voltage VFDDC falls in response to that. The dark current of the floating diffusion FD1 is proportional to the first comparison processing period PCMPR1 in which the period is the time stamp ADC (TS-ADC) period which is 10 ms at the maximum. Accordingly, the change of the inversion (flip) time of the comparator 221 is largely influenced by the dark current and shot noise of the floating diffusion FD1, therefore non-linearity is liable to occur in offset of images in the entire column, that is, fixed pattern noise (FPN), and in the AC conversion transfer curve. Further, it is difficult to separate the charge of the dark current of the floating diffusion FD1 from an actual overflow charge, therefore a joining gap (AD conversion code gap) is generated at joining points of the first AC conversion transfer curve TC1 and the second AD conversion transfer curve TC2 to be joined (boundary of AD conversion codes), so sometimes the linearity is not always guaranteed in the switching region. In such a case, smooth switching becomes impossible, discontinuous points by that become noise, and this becomes a cause of so-called tone jump or other image deterioration.

Accordingly, it is important to reduce the power consumption and suppress the influence of the dark current of the floating diffusion FD1.

Figure 13:
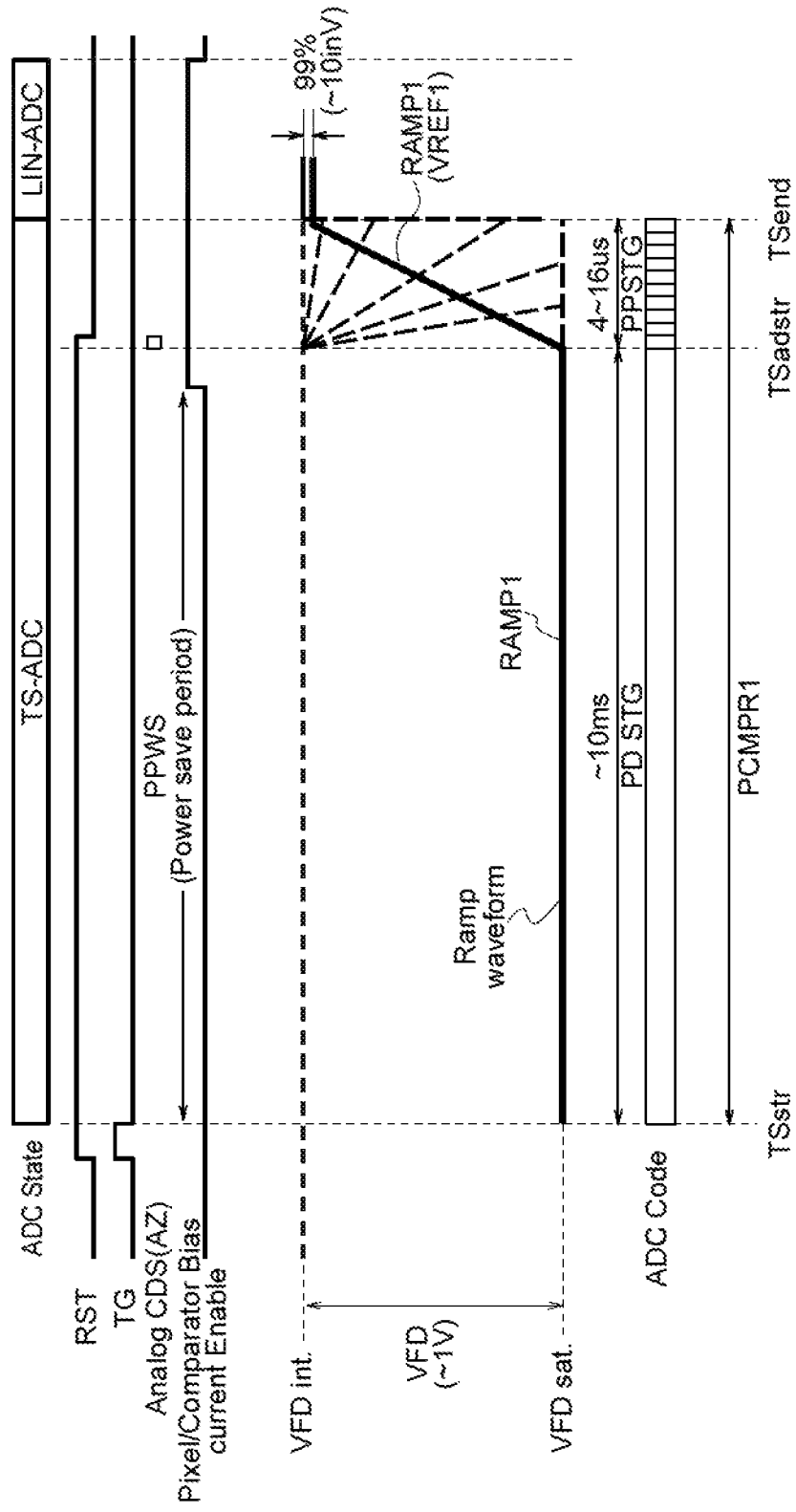
FIG. 13 is a view for explaining an AD conversion processing method etc. in a first comparison processing period for lowering a power consumption and suppressing the influence of the dark current of the floating diffusion.

FIG. 13 is a view for explaining the AD conversion processing method etc. in the first comparison processing period for lowering the power consumption and suppressing the influence of the dark current of the floating diffusion.

In the time stamp ADC of the first comparison processing CMPR1 in the present example, the AD conversion processing comparing the voltage signal VSL (VFD) of the output buffer part 211 and the reference voltage VREF1 (RAMP1) and outputting the digitized comparison result signal SCMP1 is started at a predetermined time TSadstr delayed from the starting time TSstr of the first comparison processing CMPR1. In the example in FIG. 13, a single AD conversion processing is carried out by using a high speed ADC clock in a final processing stage PPSTG immediately before an ending time TSend of the first comparison processing period PCMPR1 during the 4 to 16 μs of the time TSadstr to the ending time TSend.

The source follower element of the output buffer part 211 and the comparator 221 are supplied with the bias currents to become driven states. However, due to a power save period PEWS in a predetermined delay stage period PDSTG from the starting time TSstr of the first comparison processing to the time TSadstr at which the AD conversion processing is started, the supply of the bias currents is stepped (saved). Further, the floating diffusion FD1 forming the output node ND1 is reset during the predetermined delay stage period PDSTG from the starting time TSstr of the first comparison processing CMPR1 to the time TSadstr at which the AD conversion processing is started.

The reading part 60, at the starting point of time TSadstr of the AD conversion processing, resets the floating diffusion FD1 forming the output node ND1 to the reset level, then performs the AD conversion processing comparing the voltage signal VSL of the output buffer part 211 and the reference voltage VREF1. More specifically, the reading part 60, at the starting point of time TSadstr of the AD conversion processing, performs the AD conversion processing comparing the voltage signal VSL of the output buffer part 211 and the ramp state reference voltage RAMP1 at the time of resetting the floating diffusion FD1 forming the output node ND1 to the reset level up to the ending time TSend of the first comparison processing period PCMPR1.

Note that, in the first embodiment, the ramp state reference voltage RAMP1 is fixed to the level corresponding to the output voltage signal level VFDsat at the time of saturation in the predetermined delay stage period PDSTG from the starting time TSstr of the first comparison processing to the time TSadstr at which the AD conversion processing is started.

Further, the AD conversion processing is carried out before the end of the first comparison processing period PCMPR1 of the time stamp (TS) ADC mode. The final value of the ramp state reference voltage RAMP1 set in that period is for example set to 99% as shown in FIG. 13. The final value of this ramp state sub reference voltage RAMP1 can be set to any value. Note, desirably, the final value of the reference voltage RAMP1 is set to a level capable of avoiding erroneous judgment in the comparator 221 even if the output voltage signal of the output buffer part 211 changes due to the dark current of the floating diffusion FD1 in the AD conversion processing period in the final stage of the first comparison processing period PCMPR1. The percentage of the final value is different according to actual circuit conditions.

As described above, in the AD conversion processing in this time stamp ADC, the floating diffusion FD1 is held in the reset state up to the last time period of 4 to 16 μs before the end of the first comparison processing period PCMPR1 of the time stamp ADC (TS-ADC). Further, during this time period of 4 to 16 μs, a single AD conversion processing is carried out by using a high speed ADC clock. The bias current of the source follower element and the bias current of the comparator become active only in the AD conversion processing period, therefore the power consumption is greatly reduced, if the same integration time and AD conversion processing period are set, when assuming the time period of 10 ms in the time stamp ADC (TS-ADC) and the time period of 4 μs in the linear ADC (LIN-ADC), a reduction of power of $1/1250\times$ can be expected.

Further, by substantially always resetting the floating diffusion FD1, the dark current of the floating diffusion FD1 is completely removed and the dark current becomes almost zero in the final processing stage period PPSTG of 4 to 16 μs. Accordingly, an AD conversion code gap generated due to the dark current of the floating diffusion FD1 is completely removed. Further, the analog CDS operation is carried out before the AD conversion processing in the time stamp ADC (TS-ADC), therefore 1/f noise and RTS noise including offset can be greatly suppressed, so reading of noise of the time stamp ADC (TS-ADC) can be reduced.

The following formula (Equation 1) shows a numerical expression model defining the DR (dynamic range).

DR Definition         Equation 1
$$DR = 20\log\left(\frac{Max \cdot Detectable\ Lux}{SNR1\ Lux}\right)$$

Further, the following FIG. 26 shows the results of simulation of the broader dynamic range etc. according to the AD conversion processing in the time stamp ADC according to the present embodiment as shown in FIG. 13.

As shown in FIG. 26, even if the AD conversion processing period of the time stamp ADC (TS-ADC) is 4 μs, by setting the ADC clock cycle to 10 ns, a dynamic range of 120 dB can be realized. In order to realize a higher dynamic range (DR), use can be made of an ADC clock cycle less than 10 ns.

FIG. 14A and FIG. 14B are views for explaining the operation according to the AD conversion processing method in the first comparison processing period for lowering the power consumption and suppressing the influence of the dark current of the floating diffusion and are views for explaining the operation where the photodiode causes overflowing. FIG. 14A is a potential view showing that the photodiode PD1 is full with the accumulated charge and the floating diffusion FD1 is in the reset state, and FIG. 14B is a potential view at the time of AD conversion processing in the final processing stage.

In FIG. 14A, during a time period where the floating diffusion FD1 is reset in the time stamp ADC (TS-ADC) phase, the incident light has an intensity strong enough to fill the photodiode PD1 with the charge. The voltage level of the floating diffusion FD1 is the same as it is since the influence of the dark current of the floating diffusion FD1 is excluded even if a strong incident light cones since the control signal RST is an H level, the reset transistor RST1-Tr is ON, and the overflowed charge is discharged to the power supply VDD.

In FIG. 14B, the control signal RST is an L level and the reset transistor RST1-Tr is in an off state, so the voltage VFD of the floating diffusion FD1 begins to fall corresponding to the incident light level when the charge overflows. In this stage, the AD conversion processing in the time stamp ADC (TS-ADC) is executed.

FIG. 15A and FIG. 15B are views for explaining the operation according to the AD conversion processing method in the first comparison processing period for lowering the power consumption and suppressing the influence of the dark current of the floating diffusion and are views for explaining the operation where the photodiode does not cause overflowing. FIG. 15A is a potential view showing that the photodiode PD1 is not full with the accumulated charge and the floating diffusion FD is in the reset state, and FIG. 15B is a potential view at the time of AD conversion processing in the final processing stage.

In FIG. 15A, during a time period where the floating diffusion FD1 is reset in the time stamp ADC (TS-ADC) phase, the incident light does not have an intensity strong enough to fill the photodiode PD1 with the charge. The voltage level of the floating diffusion FD1 is the same as it is since the influence of the dark current of the floating diffusion FD1 is excluded even if a strong incident light comes since the control signal RST is an H level, the reset transistor RST1-Tr is ON, and the overflowed charge is discharged to the power supply VDD.

In FIG. 15B, the control signal RST is an L level and the reset transistor RST1-Tr is in an off state, the photodiode PD1 is not full with the charge, and the dark current of the floating diffusion FD1 is negligible. Therefore, even if the reset transistor RST1-Tr becomes off, the voltage VFD of the floating diffusion FD1 does not change. Accordingly, the AD conversion code of this time stamp ADC (TS-ADC) becomes 0LSB.

As explained above, in the time stamp ADC of the first comparison processing CMPR1 in the present example, the AD conversion processing comparing the voltage signal VSL (VFD) of the output buffer part 211 and the reference voltage VREF1 (RAMP1) and outputting the digitized comparison result signal SCMP1 is started at the predetermined time TSadstr delayed from the starting time TSstr of the first comparison processing CMPR1. Accordingly, a mean current consumption of the time stamp ADC (TS-ADC) can be greatly reduced. Further, the current consumption becomes irrelevant to the exposure time (TS-ADC period).

Further, by substantially always resetting the floating diffusion FD1, the dark current of the floating diffusion FD1 is completely removed, therefore the dark current in the final processing stage period PPSTG of 4 to 16 μs becomes almost zero. Accordingly, the AD conversion code gap generated due to the dark current of the floating diffusion FD1 can be completely removed. Further, the analog CDS operation is carried out before the AD conversion processing in the time stamp ADC (TS-ADC), therefore the 1/f noise and the RTS noise including offset can be greatly suppressed, so the reading of noise of the time stamp ADC (TS-ADC) can be reduced.

Further, the final value of the ramp state reference voltage RAMP1 set in the AD conversion processing period in the final stage of the first comparison processing period PCMPR1 is for example set to 99%. Due to this, at the time of each sub AD conversion it becomes possible to prevent an erroneous inversion (flip) of the comparator 221 due to a clock field through phenomenon and mismatch of the comparator 221 from occurrence.

Further, the floating diffusion FD1 is filled with the charge when light not less than FWC is incident. Accordingly, if the AD conversion processing is started and the charge overflows soon, the FWC fluctuation is automatically cancelled. As a result, the offset correction of the time stamp ADC (TS-ADC) can be emitted, and the complexity of combination of the transfer functions of the linear ADC (LIN-ADC) and the time stamp ADC (TS-ADC) can be lightened and reduced.

Further, even if the AD conversion processing of the time stamp ADC (TS-ADC) is started with a delay, the integration time of the charge corresponding to such a quantity of light that does not cause overflowing from the photodiode PD1 is the same, therefore no drop of sensitivity in the linear ADC (LIN-ADC) occurs.

Further, in the time stamp ADC (TS-ADC) with respect to the charge overflowing from the photodiode PD1 as well, by making the AD conversion clock sufficiently fast, an AD conversion gradation of a high light region can be sufficiently obtained in 4 μs, therefore it is possible to expand the dynamic range. For example, in the case of 4 μm pixels, an FWC of 5000 electrons, an F5.6 lens, and a highest illumination of 100,000 LUX, in computation, electrons overflow from the photodiode PD1 at about 100 ns. In this case, by using an AD clock faster than 100 ns, loss of the overflowing charge (electrons) is eliminated, so detailed image in a high light region can be obtained.

Further, in the case of a quantity of light that does not cause overflowing of the charge from the photodiode PD1, whether the start of the AD conversion processing of the time stamp ADC (TS-ADC) is delayed or not delayed is quite irrelevant to the charge accumulated in the photodiode PD1. Therefore, in the linear ADC (LIN-ADC) after that, the same ADC code can be obtained. On the other hand, in a case of a quantity of light that causes overflowing of the charge from the photodiode PD1, a quantity of the charge during the delay of the start of the AD conversion processing of the time stamp ADC (TS-ADC) is lost, but these charges are regenerated after the start of the AD conversion processing, therefore no code gap is generated between the linear ADC (LIN-ADC) and the time stamp ADC (TS-ADC).

Stacked Structure of Solid-State Imaging Device 10

Next, the stacked structure of the solid-state imaging device 10 according to the first embodiment will be explained.

Figure 17:
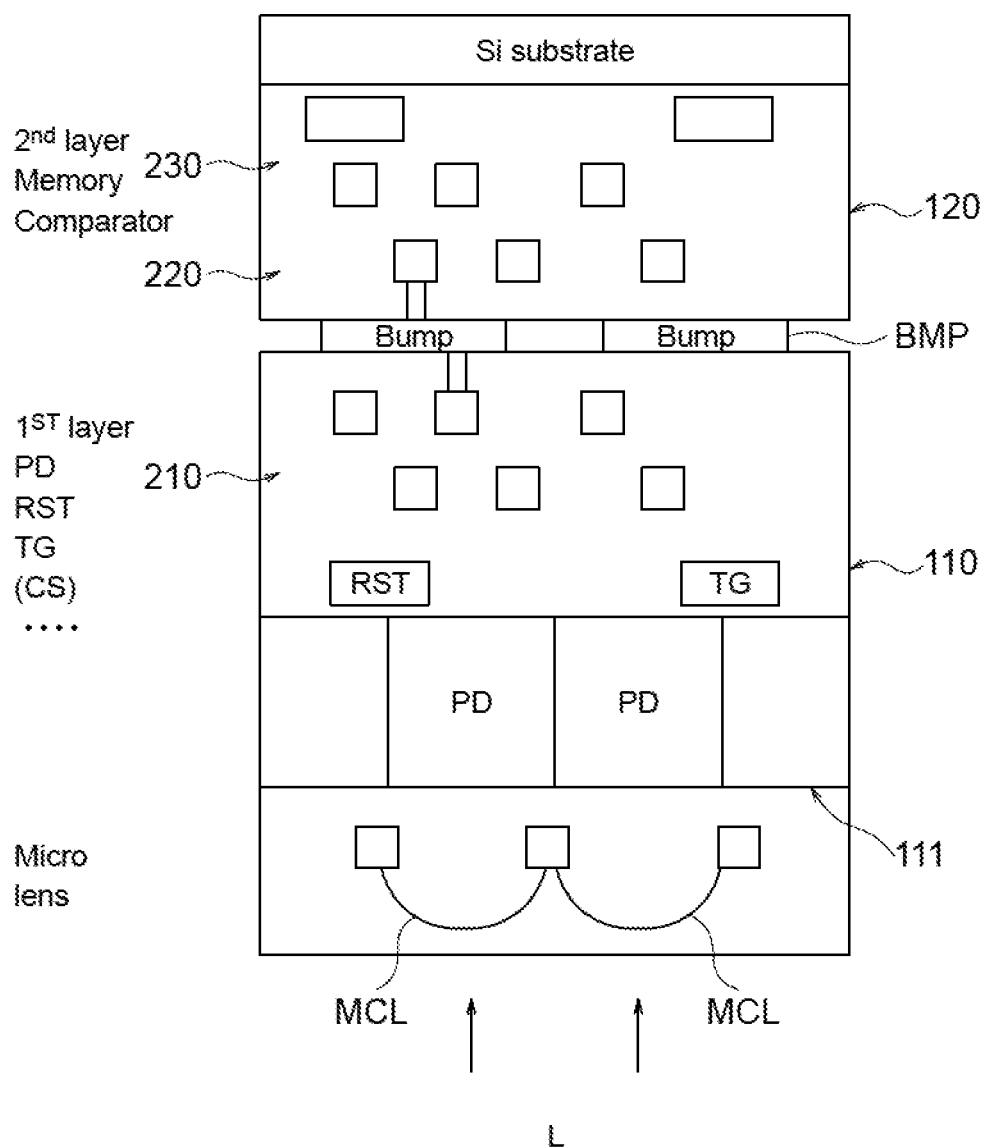
FIG. 17 is a schematic cross-sectional view for explaining the stacked structure of the solid-state imaging device according to the first embodiment.

FIG. 16A and FIG. 16B are schematic views for explaining the stacked structure of the solid-state imaging device 10 according to the first embodiment. FIG. 17 is a simple view for explaining the stacked structure of the solid-state imaging device 10 according to the first embodiment.

The solid-state imaging device 10 according to the first embodiment has a stacked structure of a first substrate (upper substrate) 110 and a second substrate (lower substrate) 120. The solid-state imaging device 10 is for example formed as an image capturing device having a stacked structure obtained by bonding the substrates to each other at a wafer level and cutting them by dicing. In the present example, the device has a structure of the first substrate 110 and the second substrate 120 which are stacked.

On the first substrate 110, the photoelectric converting and reading parts 210 of the digital pixels 200 in the pixel part 20 are formed centered about its center part. The photodiodes PD1 are formed an the first surface 111 side of the first substrate 110 which is the side where the light L is incident, and microlenses MCL and color filter are formed on the light incident side. On the second surface side of the first substrate 110, the transfer transistor TG1-Tr, the reset transistor RST1-Tr, the source follower transistor SF1-Tr, and the current transistor IC1-Tr are formed.

In this way, in the first embodiment, basically the photoelectric converting and reading parts 210 of the digital pixels 200 are formed in a matrix on the first substrate 110.

On the second substrate 120, AD conversion parts 220 and memory parts 230 of the digital pixels 200 are formed in a matrix. Further, the vertical scanning circuit 30, the output circuit 40, and the timing control circuit 50 may be formed on the second substrate 120 as well.

In such a stacked structure, the read-out nodes ND2 of the photoelectric converting and reading parts 210 on the first substrate 110 and the inverted input terminals (−) of the comparators 221 in the digital pixels 200 on the second substrate 120 are individually electrically connected using the signal line LSGN1, micro bumps BMP, vias (die-to-die vias), and the like as shown in for example FIG. 3. Further, in the present embodiment, the read-out nodes ND2 of the photoelectric converting and reading parts 210 on the first substrate 110 and the inverted input terminals (−) of the comparators 221 in the digital pixels 200 on the second substrate 120 are AC-coupled by coupling capacitors C221.

Reading Operation of Solid-State Imaging Device 10

The characteristic configurations and functions of the parts in the solid-state imaging device 10 were explained above. Next, the reading operation etc. of the pixel signals of the digital pixels 200 in the solid-state imaging device 10 according to the first embodiment will be explained.

Figure 18:
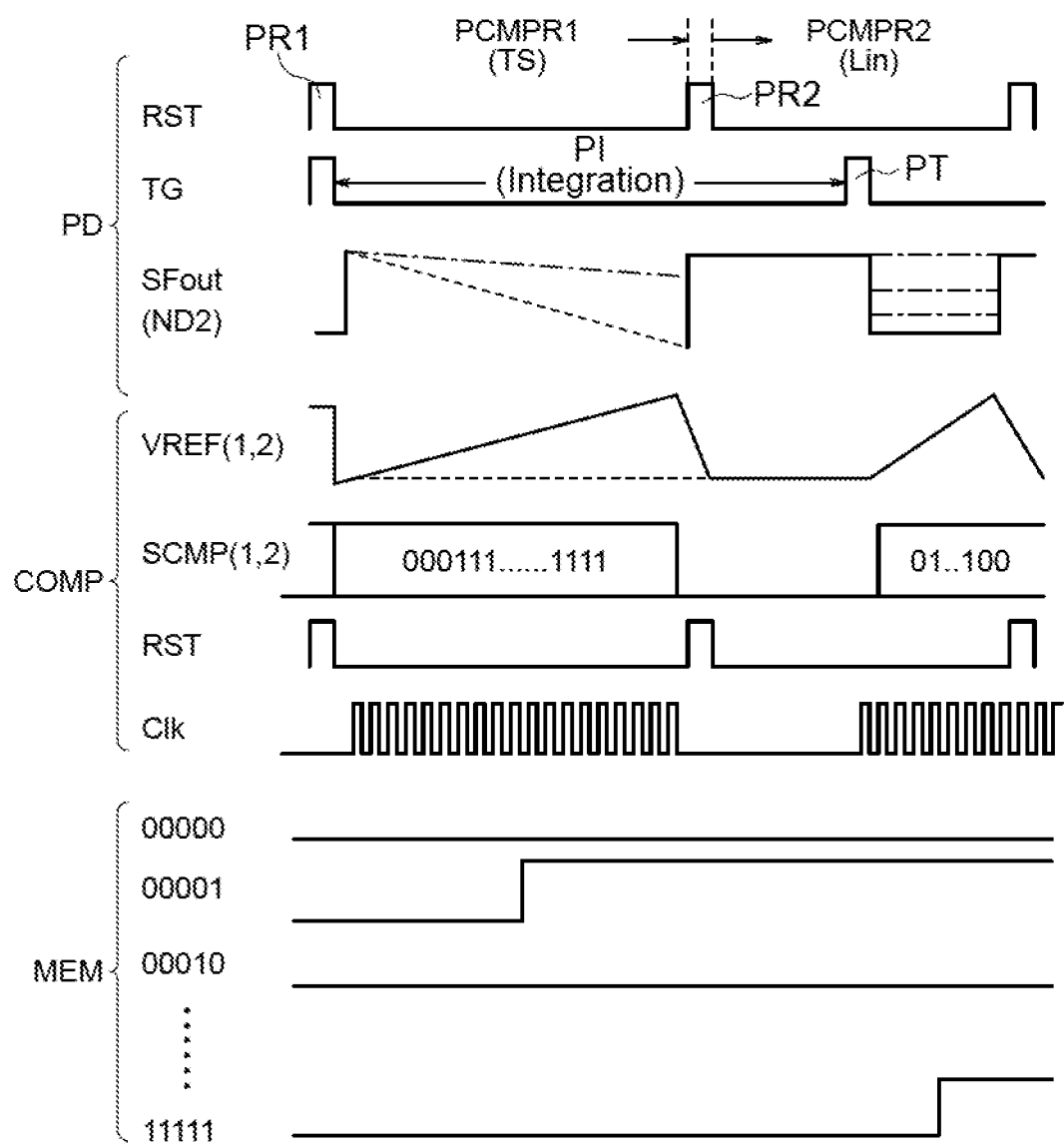
FIG. 18 is a timing chart for mainly explaining the reading operation in the pixel part at the time of a predetermined shutter mode in the solid-state imaging device according to the first embodiment.

FIG. 18 is a timing chart for mainly explaining the reading operation in the pixel part at the time of a predetermined shutter mode of the solid-state imaging device according to the first embodiment. FIG. 19A to FIG. 19D are views showing operation sequences and potential transitions for mainly explaining the reading operation in the pixel part at the time of a predetermined shutter mode in the solid-state imaging device according to the first embodiment.

Figure 19:
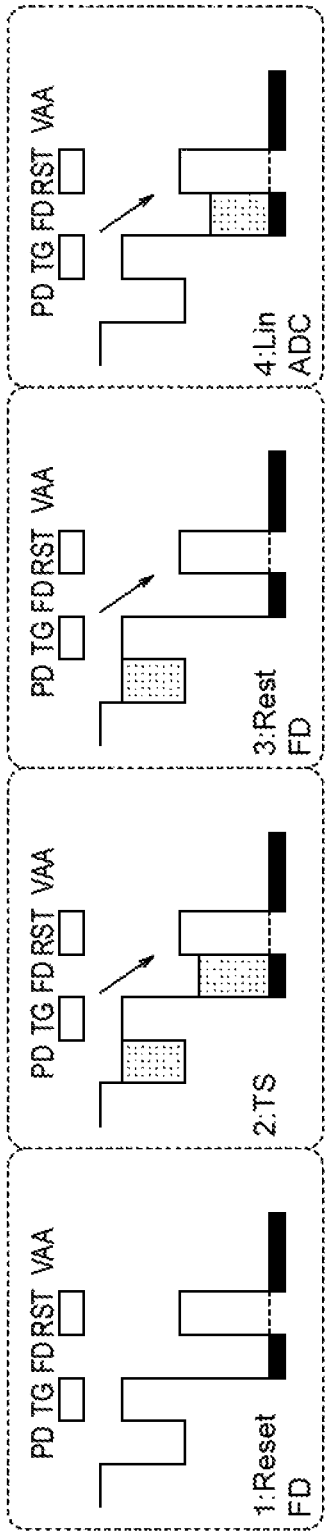
FIG. 19A to FIG. 19D are views showing the operation sequences and potential transitions for mainly explaining the reading operation in the pixel part at the time of the predetermined shutter mode in the solid-state imaging device according to the first embodiment.

First, at the start of the reading operation, as shown in FIG. 18 and FIG. 19A, a global reset resetting the photodiodes PD1 and the floating diffusions FD1 in the digital pixels 200 is carried out. In the global reset, the reset transistor RST1-Tr and the transfer transistor TG1-Tr are held in a conductive state for a predetermined period simultaneously for all pixels and the photodiodes PD1 and the floating diffusions FD1 are reset. Further, the reset transistor RST1-Tr and the transfer transistor TG1-Tr are switched to a non-conductive state simultaneously for all pixels, and exposure, that is accumulation of charge, is started simultaneously and in parallel for all pixels.

Further, as shown in FIG. 18 and FIG. 19B, the operation of the tame stamp (TS) ADC mode with respect to the overflow charge is started. The overflew charges are accumulated in the floating diffusions FD1 in the integration period PI. The time stamp ADC mode operates in the integration time PI, specifically in a period in the integration period PI up to reset of the floating diffusions FD1.

In the time stamp (TS) ADC mode, in the photoelectric converting and reading part 210, corresponding to the first comparison processing period PCMPR1 of the AD conversion part 220, a voltage signal VSL1 corresponding to the overflow charge overflowing from the photodiode PD1 to the floating diffusion FD1 as the output node in the integration period PI is output. Further, in the comparator 221 of the AD conversion part 220, the first comparison processing CMPR1 is carried out. In the time stamp ADC of the first comparison processing, the AD conversion processing comparing the voltage signal VSL (VFD) of the output buffer part 211 and the reference voltage VREF1 (RAMP1) and outputting the digitized comparison result signal SCMP1 is started at a predetermined time TSadstr delayed from the starting time TSstr of the first comparison processing CMPR1.

However, due to the power save period PPWS in the predetermined delay stage period PDSTG from the starting time TSstr of the first comparison processing up to the time TSadstr at which the AD conversion processing is started, the supply of the bias currents is stopped (saved). Further, the floating diffusion FD1 forming the output node ND1 is reset in the predetermined delay stage period PDSTG from the starting time TSstr of the first comparison processing CMPR1 to the time TSadstr at which the AD conversion processing is started.

Further, under the control of the reading part 60, at the starting point of time TSadstr of the AD conversion processing, the floating diffusion FD1 forming the output node ND1 to the reset level is reset, then the AD conversion processing comparing the voltage signal VSL of the output buffer part 211 and the reference voltage VREF1 is carried out. More specifically, under the control of the reading part 60, at the starting point of time TSadstr of the AD conversion processing, the AD conversion processing comparing the voltage signal VSL of the output buffer part 211 and the ramp state reference voltage RAMP1 is carried out from the resetting of the output node to the reset level to the ending time TSend of the first comparison processing period PCMPR1. At this time, for example, a single AD conversion processing is carried out by using a high speed ADC clock in a final processing stage PPSTG immediately before an ending time TSend of the first comparison processing period PCMPR1 during the 4 to 16 μs of the time TSadstr to the ending time TSend. Each first comparison result signal SCMP1 is output from the comparator 221, and the digital data corresponding to the first comparison result signal SCMP1 is stored in the memory 231 in the memory part 230.

Next, as shown in FIG. 18 and FIG. 19C, the operation of the time stamp (TS) ADC mode with respect to the overflow charge ends and the mode transits to the linear ADC mode and the operation shifts to the reset period PR2 of the floating diffusion FD1. In the reset period PR2, the reset transistor RST1-Tr is held in a conductive state for a predetermined period and the floating diffusion FD1 is reset. The signal at the time of reset of the floating diffusion FD1 (VRST) is read out and the digital signal is stored in the memory 232 of the memory part 230. Further, the reset transistor RST1-Tr is switched to a non-conductive state. In this case, the integration period PI is continued.

Next, as shown in FIG. 18 and FIG. 19D, the integration period PI ends and the operation shifts to the transfer period PT. In the transfer period PT, the transfer transistor TG1-Tr is held in a conductive state for a predetermined period and the accumulated charge in the photodiode PD1 is transferred to the floating diffusion FD1.

In the linear (LIN) ADC mode, in the photoelectric converting and reading part 210, corresponding to the second comparison processing period PCMPR2 of the AD conversion part 220, after the end of the integration period PI, a voltage signal VSL2 corresponding to the accumulated charge transferred from the photodiode PD1 to the floating diffusion FD1 as the output node is output. Further, in the comparator 221 of the AD conversion part 220, the second comparison processing CMPR2 is carried out. In the comparator 221, under the control of the reading part 60, after the integration period PI, a digitized second comparison result signal SCMP2 with respect to the voltage signal VSL2 corresponding to the accumulated charge transferred from the photodiode PD1 to the floating diffusion FD1 as the output node is output and the digital data corresponding to the second comparison result signal SCMP2 is stored in the memory 232 of the memory part 230.

The signal read out to the memory part 230 is executed by reading the digital signal data from the memory node. It has an MIPI data format and is, for example, sent to the outside of the solid-state imaging device 10 (image sensor) through the IO buffer 41 of the output circuit 40. This operation is globally executed with respect to the entire pixel array.

As explained above, according to the first embodiment, the solid-state imaging device 10 is configured as for example a stacked type CMOS image sensor including, in the pixel part 20, the digital pixels of the photoelectric converting and reading parts 210, AD conversion parts 220, and memory parts 230 and having a global shutter operation function. In the solid-state imaging device 10 according to the first embodiment, each digital pixel 200 has the AD conversion function, and the AD conversion part 220 has the comparator 221 performing comparison processing comparing the voltage signal read out by the photoelectric converting and reading part 210 and the reference voltage and outputting the digitized comparison result signal. Further, under the control of the reading part 60, the comparator 221 performs the first comparison processing CMPR1 outputting the digitized first comparison result signal SCMP1 with respect to the voltage signal corresponding to the overflow charge overflowing from the photodiode PD1 to the output node (floating diffusion) FD1 in the integration period and the second comparison processing CMPR2 outputting the digitized second comparison result signal SCMP2 with respect to the voltage signal corresponding to the accumulated charge of the photodiode PD1 transferred to the floating diffusion FD1 (output node) in the transfer period after the integration period.

Further, in the time stamp ADC of the first comparison processing, the AD conversion processing comparing the voltage signal VSL of the output buffer part 211 and the reference voltage VREF and outputting the digitized comparison result signal is started with a delay from the starting time of the first comparison processing. Further, the source follower element of the output buffer part 211 and the comparator 221 are supplied with the bias currents to become driven states, but the supply of the bias currents is stopped (saved) in a predetermined period from the start of the first comparison processing to the start of the AD conversion processing. Further, the output node ND1 is reset in a predetermined period from the start of the first comparison processing to the start of the AD conversion processing.

Accordingly, according to the solid-state imaging device 10 in the first embodiment, the charges overflowing from the photodiodes in the integration period are utilized in real time, and it becomes possible to suppress the influence of the dark current of the floating diffusion FD1 while lowering the power consumption, therefore it becomes possible to suppress deterioration of the image while substantially realizing a broader dynamic range and a higher frame rate. Further, according to the first embodiment, it is possible to substantially realize a broader dynamic range and a higher frame rate and in addition possible to lower noise, possible to expand the effective pixel region to the maximum limit, and possible to raise the value relative to the cost to the maximum limit.

As described above, according to the first embodiment, in the time stamp ADC of the first comparison processing CMPR1 in the present example, the AD conversion processing comparing the voltage signal VSL (VFD) of the output buffer part 211 and the reference voltage VREF1 (RAMP1) and outputting the digitized comparison result signal SCMP1 is started at the predetermined time TSadstr delayed from the starting time TSstr of the first comparison processing CMPR1. Accordingly, a mean current consumption of the time stamp ADC (TS-ADC) can be much reduced.

Further, by substantially always resetting the floating diffusion FD1, the dark current of the floating diffusion FD1 is completely removed, so the dark current in the final processing stage period PPSTG can be made almost zero. Accordingly, the AD conversion code gap generated due to the dark current of the floating diffusion FD1 can be completely removed. Further, the analog CDS operation is carried out before the AD conversion processing in the time stamp ADC (TS-ADC), therefore the 1/f noise and the RTS noise including offset can be greatly suppressed, so reading of noise of the time stamp ADC (TS-ADC) can be reduced.

Further, the final value of the ramp state reference voltage RAMP1 set in the AD conversion processing period in the final stage of the first comparison processing period PCMPR1 is for example set to 99%. Due to this, at the time of each sub AD conversion, it becomes possible to prevent an erroneous inversion (flip) of the comparator 221 due to a clock field through phenomenon and mismatch of the comparator 221 from occurrence.

Further, according to the first embodiment, even if the AD conversion processing of the time stamp ADC (TS-ADC) is started with a delay, the integration time of the charge corresponding to a quantity of light that does not cause overflowing from the photodiode PD1 is the same, therefore there is the advantage that no drop of sensitivity in the linear ADC (LIN-ADC) occurs.

Further, also in the time stamp ADC (TS-ADC) with respect to the charge overflowing from the photodiode PD1, it is possible to sufficiently obtain the AD conversion gradation in a high light region in 4 µs by making the AD conversion clock sufficiently fast, therefore there are the advantages that it is possible to expand the dynamic range and possible to obtain a detailed image of the high light region.

Further, in the case of a quantity of light that does not cause overflowing of the charge from the photodiode PD1, whether the start of the AD conversion processing of the time stamp ADC (TS-ADC) is delayed or not delayed is quite irrelevant to the charge accumulated in the photodiode PD1, therefore the same ADC code can be obtained in the linear ADC (LIN-ADC) after that. On the other hand, in the case of such a quantity of light that causes overflowing of the charge from the photodiode PD1, a quantity of the charge during the delay of the start of the AD conversion processing of the time stamp ADC (TS-ADC) is lost, but these charges are regenerated after the start of the AD conversion processing, therefore there is an advantage that no cods gap is generated between the linear ADC (LIN-ADC) and the time stamp ADC (TS-ADC).

Further, according to the solid-state imaging device 10 of the first embodiment, it is possible to prevent complication of the configuration while preventing a drop in the area efficiency in layout.

Further, the solid-state imaging device 10 according to the first embodiment has a stacked structure of the first substrate (upper substrate) 110 and second substrate (lower substrate) 120. Accordingly, in the first embodiment, basically, by forming the first substrate 110 side by only the NMOS system elements and by expanding the effective pixel region to the maximum limit by the pixel array, the value relative to the cost can be raised to the maximum limit.

Second Embodiment

Figure 20:
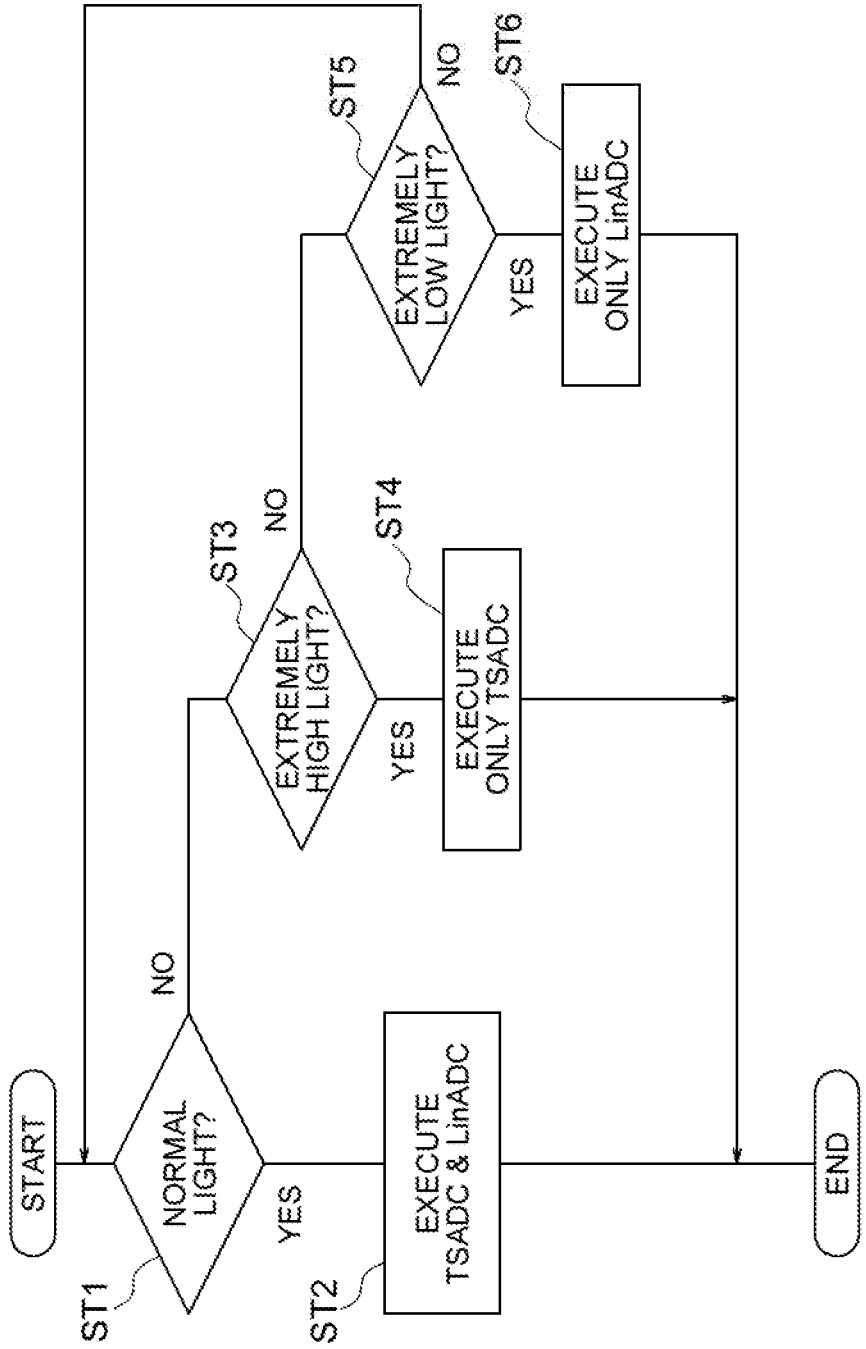
FIG. 20 is a view for explaining a solid-state imaging device according to a second embodiment of the present invention and a view showing an example of selection processing of a time stamp ADC mode operation and linear ADC mode operation.

FIG. 20 is a view for explaining a solid-state imaging device according to a second embodiment of the present invention and is a view showing an example of selection processing of a time stamp ADC mode operation and linear ADC mode operation.

The difference of a solid-state imaging device 10A according to the second embodiment from the solid-state imaging device 10 according to the first embodiment explained above is as follows. In the solid-state imaging device 10 according to the first embodiment, the time stamp (TS) ADC mode operation and the linear (Lin) ADC mode operation are successively carried out.

Contrary to this, in the solid-state imaging device 10A according to the second embodiment, the time stamp (TS) ADC mode operation and the linear (Lin) ADC mode operation can be selectively carried out corresponding to the light.

In the example in FIG. 20, in a case of normal light (ST1), the time stamp ADC mode operation and the linear ADC mode operation are continuously carried out (ST2). In a case where the light is not normal but is very (extremely) high (ST1, ST3), a probability of overflowing of the charge from the photodiode PD1 to the floating diffusion FD1 is high, therefore only the time stamp ADC mode operation is carried out (ST4). In a case where the light is not normal, not very (extremely) high either, but very (extremely) low (ST1, ST3, ST5), the probability of overflowing of the charge from the photodiode PD1 to the floating diffusion FD1 is extremely low, therefore only the linear ADC mode operation is carried out (ST6).

According to the second embodiment, the same effect as the effect by the first embodiment explained above can be obtained of course. Also, it becomes possible to raise the speed of read-out processing and lower the power consumption.

Third Embodiment

Figure 21:
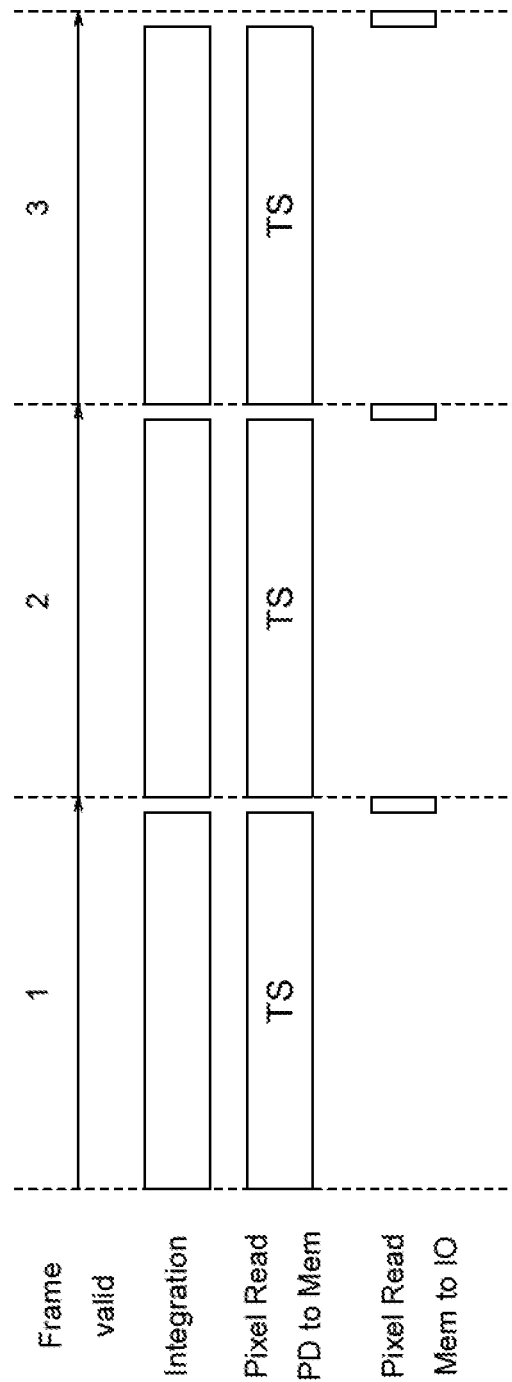
FIG. 21 is a view showing an example of a frame read out sequence in a solid-state imaging device according to a third embodiment of the present invention.
Figure 22:
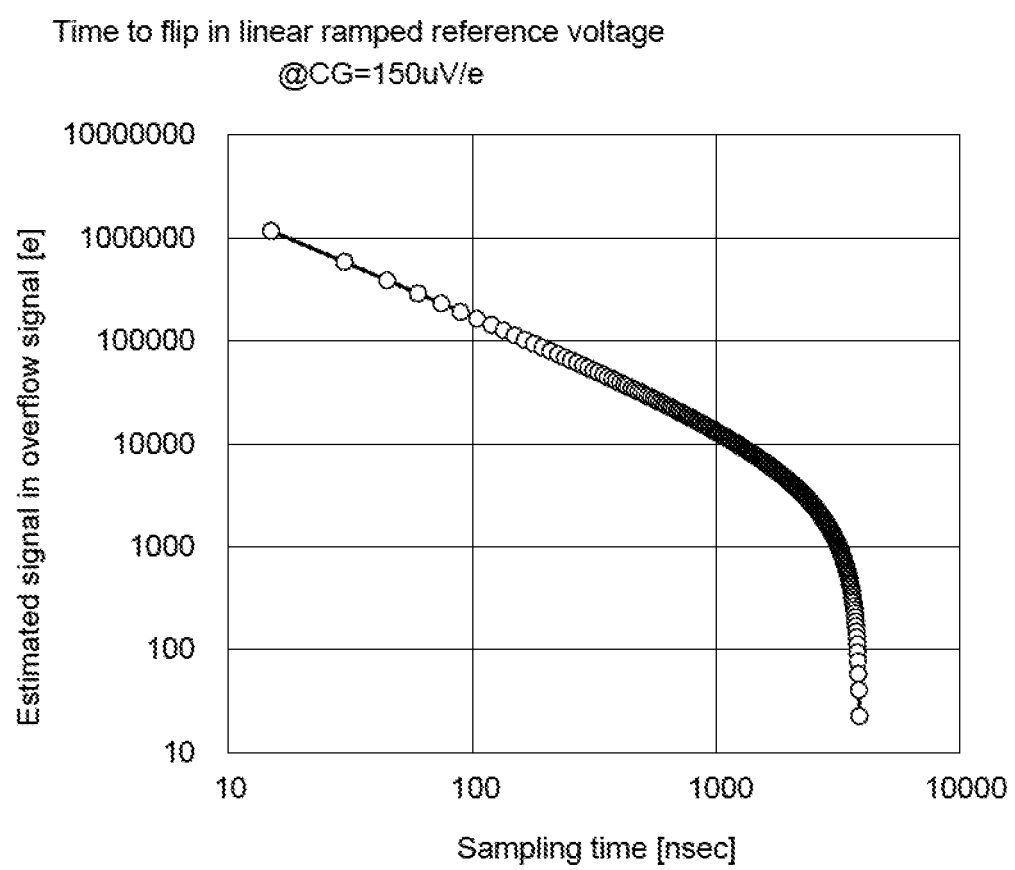
FIG. 22 is a view showing a state of light-to-time conversion where a reference voltage is input to a comparator according to the third embodiment.
Figure 23B:
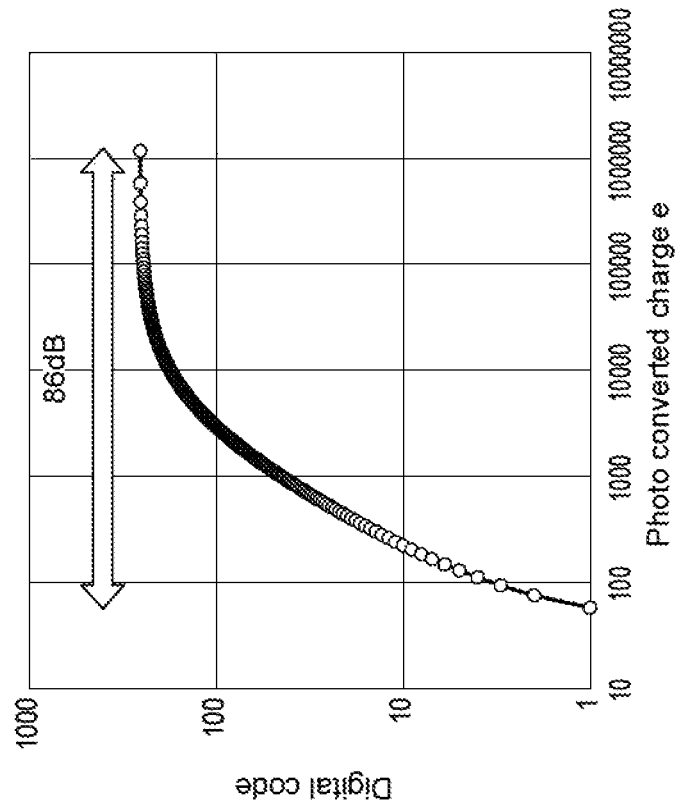
FIG. 23A and FIG. 23B are views showing relationships between a digital code and a quantity of the charge according to a light conversion in the third embodiment.
Figure 23A:
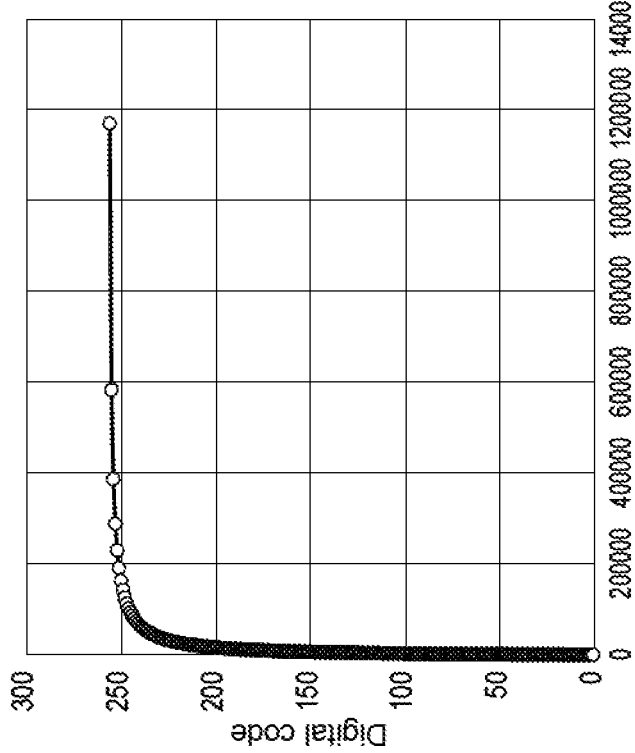

FIG. 21 is a view showing an example of a frame read out sequence in a solid-state imaging device 10B according to a third embodiment of the present invention. FIG. 22 is a view showing a state of light-to-time conversion where the reference voltage is input to a comparator according to the third embodiment. In FIG. 22, an abscissa indicates a sampling time, and an ordinate indicates the estimated signal in the overflow signal. Note that, the overflow signal referred to here is estimated by rendering the transfer transistor TG1-Tr the conductive state to set a condition where the charge is not accumulated in the photodiodes PD1 (non-overflow). FIG. 22 shows a sampling time at which the comparator 221 inverts which corresponds to the non-overflow charge (signal) according to the nature (suitability) of the light applied. FIG. 23A and FIG. 23B are views showing the relationships between the digital codes and the quantities of charge according to the light conversion in the third embodiment. FIG. 23A shows the characteristic where use is made of the linear ramp signal, and FIG. 23B shows the characteristic where use is made of a log signal.

In the third embodiment, the reading part 60 controls the comparator 221 so as to output the digitized first comparison result signal SCMP1 with respect to the voltage signal VSL corresponding to the charge by the first comparison processing CMPR1 even if a charge does not overflow from the photodiode PD1 to the floating diffusion FD1 as the output node in the integration period.

In the third embodiment, good conversion processing can be realized and, depending on the case, a dynamic range performance of 86 dB can be realized.

Fourth Embodiment

Figure 24:
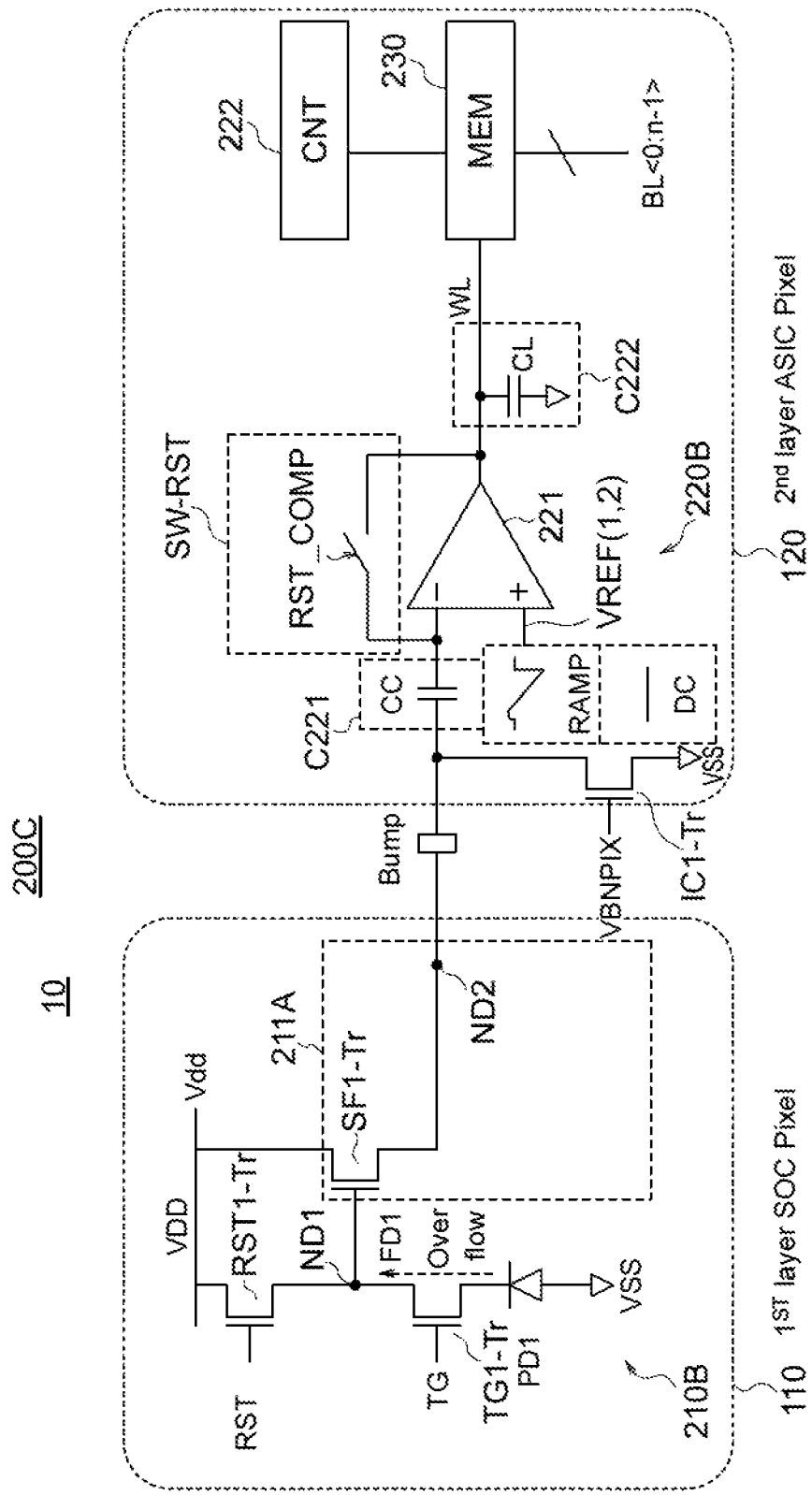
FIG. 24 is a circuit diagram showing an example of a pixel in a solid-state imaging device according to a fourth embodiment of the present invention.

FIG. 24 is a view showing an example of the configuration of a solid-state imaging device according to a fourth embodiment of the present invention.

The difference of a solid-state imaging device 10C according to the fourth embodiment from the solid-state imaging device 10 according to the first embodiment explained above is as follows. In the solid-state imaging device 10C according to the fourth embodiment, the current transistor IC1-Tr as the current source is arranged not on the first substrate 110 side, but on for example the input side of the AD conversion part 220 on the second substrate 120 side.

According to the fourth embodiment, the same effect as the effect by the first embodiment explained above can be obtained.

The solid-state imaging devices 10, 10A, 10B, and 10C explained above can be applied, as image capturing devices, to digital cameras, video cameras, portable terminals, or monitoring cameras, cameras for medical endoscopes, and other electronic apparatuses.

Figure 25:
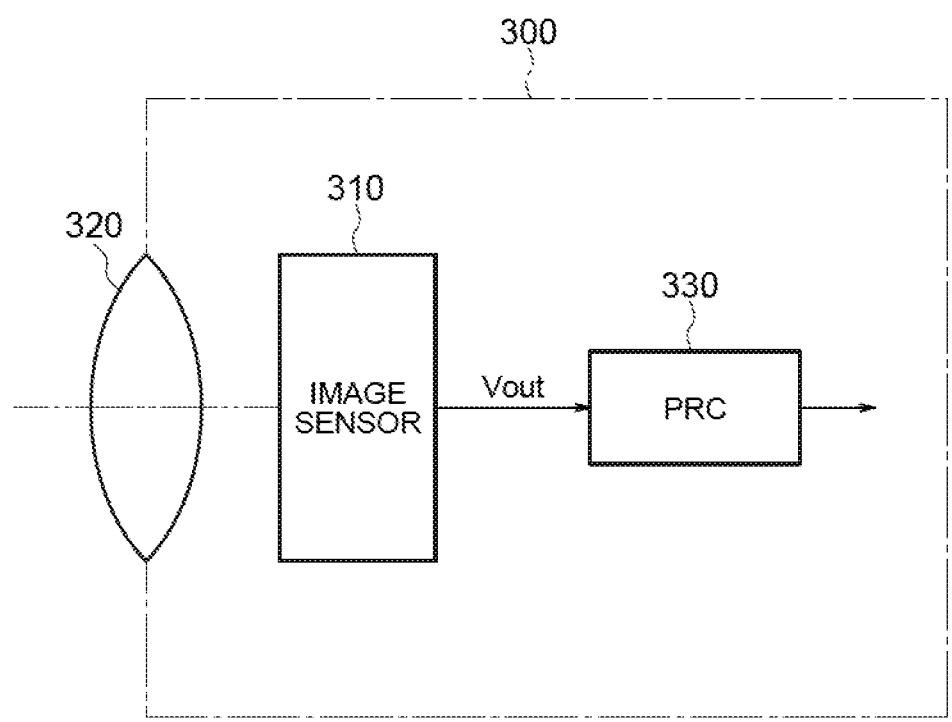
FIG. 25 is a view showing an example of the configuration of an electronic apparatus to which the solid-state imaging device according to an embodiment of the present invention is applied.

FIG. 25 is a view showing an example of the configuration of an electronic apparatus mounting a camera system to which the solid-state imaging device according to an embodiment of the present invention is applied.

The electronic apparatus 300, as shown in FIG. 25, has a CMOS image sensor 310 to which the solid-state imaging device 10 according to the present embodiment can be applied. Further, the electronic apparatus 300 has an optical system (lens etc.) 320 which guides an incident light (forms a subject image) into a pixel region of this CMOS image sensor 310. The electronic apparatus 300 has a signal processing circuit (PRC) 330 for processing the output signals of the CMOS image sensor 310.

The signal processing circuit 330 applies predetermined signal processing with respect to the output signals of the CMOS image sensor 310. The image signal processed in the signal processing circuit 330 can be projected as a moving image onto a monitor formed by a liquid crystal display or the like or can be output to a printer. Further, it can be directly recorded in a recording medium such as a memory card. Various embodiments are possible.

As explained above, by mounting the solid-state imaging devices 10, 10A, 10B, and 10C explained before as the CMOS image sensors 310, it becomes possible to provide high performance, small-sized, and low-cost camera systems. Further, it is possible to realize for example monitoring cameras or cameras for medical endoscopes or other electronic apparatuses which are used for applications where there are restrictions in mounting size, number of connectable cables, cable length, installation height, etc. in requirements for camera installation.

What is claimed is:

1. A solid-state imaging device, comprising
a pixel part in which pixels for performing photoelectric conversion are arranged and
a reading circuit which reads out pixel signals from the pixels in the pixel part, wherein
each pixel includes:
a photoelectric conversion circuit which accumulates a charge generated by photoelectric conversion in an integration period,
a transfer circuit capable of transferring the charge accumulated in the photoelectric conversion circuit in a transfer period after the integration period,
an output node formed by a floating diffusion to which the charge accumulated in the photoelectric conversion circuit is transferred through the transfer circuit,
an output buffer part which converts the charge at the output node to a voltage signal corresponding to a quantity of the charge and outputs the converted voltage signal,
a comparator which performs comparison processing for comparing the voltage signal of the output buffer part and a reference voltage and outputting a digitized comparison result signal, and
a memory part for storing data corresponding to the comparison result signal of the comparator, and
the comparator, under the control of the reading circuit, performs
a first comparison processing for outputting a digitized first comparison result signal with respect to the voltage signal corresponding to an overflow charge overflowing from the photoelectric conversion circuit to the output node in the integration period, and
a second comparison processing outputting a digitized second comparison result signal with respect to the voltage signal corresponding to the accumulated charge of the photoelectric conversion circuit transferred to the output node in the transfer period after the integration period, and
in the first comparison processing, starts an analog-to-digital (AD) conversion processing for comparing the voltage signal of the output buffer part and the reference voltage and outputting the digitized comparison result signal, with a delay from a starting time of the first comparison processing.

2. The solid-state imaging device according to claim 1, wherein:
the output buffer part and the comparator are supplied with bias currents to enter a driven state, and the supply of the bias currents is stopped in a predetermined period from a start of the first comparison processing up to a start of the AD conversion processing.

3. The solid-state imaging device according to claim 1, wherein:
the output node is reset in a predetermined period from a start of the first comparison processing up to a start of the AD conversion processing.

4. The solid-state imaging device according to claim 1, wherein:
the reading circuit, at a starting time of the AD conversion processing, resets at least the output node to a reset level, and then performs the AD conversion processing for comparing the voltage signal of the output buffer part and the reference voltage.

5. The solid-state imaging device according to claim 1, wherein:
the reading circuit, at a starting time of the AD conversion processing, performs the AD conversion processing for comparing the voltage signal of the output buffer part and a ramp shaped reference voltage from a time of resetting at least the output node to a reset level up to an end of a first comparison processing period.

6. The solid-state imaging device according to claim 5, wherein:
the ramp shaped reference voltage is fixed to a level corresponding to a level of the output voltage signal at a time of saturation in a predetermined period from a start of the first comparison processing to a start of the AD conversion processing.

7. The solid-state imaging device according to claim 1, wherein:
a final value of the reference voltage is set to a level capable of avoiding erroneous determination in the comparator even if the output voltage signal of the output buffer part changes due to a dark current of the output node in a period of the AD conversion processing.

8. The solid-state imaging device according to claim 1, wherein:
the comparator, in the first comparison processing,
outputs the first comparison result signal corresponding to a time in accordance with a quantity of the overflow charge, and
handles comparison processing with a light level from a signal level of the photoelectric conversion circuit in a maximum sampling time at which the overflow charge begins to overflow from the photoelectric conversion circuit to the output node to a signal level obtained in a minimum sampling time.

9. The solid-state imaging device according to claim 1, wherein:
the integration period is a period from when the photoelectric conversion circuit and the output node are reset to a reset level to when the transfer circuit is switched to a conductive state and the transfer period is started,
a period of the first comparison processing is a period from when the photoelectric conversion circuit and the output node are reset to the reset level to when the output node is reset to the reset level before the transfer period is started, and
a period of the second comparison processing is a period after the output node is reset to the reset level and is a period including a period after the transfer period.

10. The solid-state imaging device according to claim 1, wherein:
the reading circuit performs control so as to selectively perform the first comparison processing and the second comparison processing corresponding to a light intensity.

11. The solid-state imaging device according to claim 10, wherein:
the reading circuit performs
control so as to perform the first comparison processing and the second comparison processing in a case of normal light intensity,
control so as to perform the first comparison processing in a case of a higher light intensity than the normal light intensity, and
control so as to perform the second comparison processing in a case of a lower light intensity than the normal light intensity.

12. The solid-state imaging device according to claim 1, wherein:
the reading circuit controls the comparator so as to perform the first comparison processing and thereby output the digitized first comparison result signal with respect to the voltage signal corresponding to the charge even in a case where the overflow charge does not overflow from the photoelectric conversion circuit to the output node in the integration period.

13. The solid-state imaging device according to claim 1, wherein:
the pixel includes
a floating diffusion as the output node, and
a reset circuit which resets the floating diffusion to a predetermined potential in a reset period, and
the output buffer part includes
a source follower element for converting the charge in the floating diffusion to the voltage signal in accordance with the quantity of the charge and outputting the converted signal and
a current source connected to a source of the source follower element.

14. The solid-state imaging device according to claim 1, wherein:
in the comparator,
the voltage signal of the output buffer part is supplied to a first input terminal,
the reference voltage is supplied to a second input terminal, and
a coupling capacitor is connected to a supply line of the voltage signal to the first input terminal.

15. The solid-state imaging device according to claim 14, wherein:
in the comparator,
a reset switch is connected between an output terminal and the first input terminal, and
a load capacitor is connected on the output terminal side.

16. The solid-state imaging device according to claim 1, wherein:
the device includes
a first substrate and
a second substrate,
the first substrate and the second substrate have a stacked structure where the two substrates are connected through a connection part,
at least the photoelectric conversion circuit, the transfer circuit, the output node, and the output buffer part in the pixel are formed on the first substrate, and
at least the comparator, the memory part, and at least a portion of the reading circuit are formed on the second substrate.

17. The solid-state imaging device according to claim 16, wherein:

the pixel includes
a floating diffusion as the output node and
a reset circuit which resets the floating diffusion to a predetermined potential in a reset period,
the output buffer part includes
a source follower element converting the charge in the floating diffusion to the voltage signal in accordance with the quantity of the charge and outputting the converted signal, and
a current source connected to a source of the source follower element,
the floating diffusion, the reset circuit, and the source follower element are formed on the first substrate, and
the current source is formed on the first substrate or the second substrate.

18. A method for driving a solid-state imaging device having
a pixel part in which pixels for performing photoelectric conversion are arranged, and
a reading circuit which reads out pixel signals from the pixels in the pixel part, wherein
each pixel includes
a photoelectric conversion circuit which accumulates a charge generated by photoelectric conversion in an integration period,
a transfer circuit capable of transferring the charge accumulated in the photoelectric conversion circuit in a transfer period after the integration period,
an output node formed by a floating diffusion to which the charge accumulated in the photoelectric conversion circuit is transferred through the transfer circuit,
an output buffer part which converts the charge at the output node to a voltage signal corresponding to a quantity of the charge and outputs the converted voltage signal,
a comparator which performs comparison processing for comparing the voltage signal of the output buffer part and a reference voltage and outputting a digitized comparison result signal, and
a memory part for storing data corresponding to the comparison result signal of the comparator,
the method for driving a solid-state imaging device comprising
when reading out the pixel signals of the pixels, in the comparator, under the control of the reading circuit, performing
a first comparison processing for outputting a digitized first comparison result signal with respect to the voltage signal corresponding to an overflow charge overflowing from the photoelectric conversion circuit to the output node in the integration period, and
a second comparison processing for outputting a digitized second comparison result signal with respect to the voltage signal corresponding to the accumulated charge of the photoelectric conversion circuit transferred to the output node in the transfer period after the integration period and,
in the first comparison processing, starting an analog-to-digital (AD) conversion processing for comparing the voltage signal of the output buffer part and the reference voltage and outputting the digitized comparison result signal, with a delay from a starting time of the first comparison processing.

19. An electronic apparatus, comprising
a solid-state imaging device, and
a lens for forming a subject image in the solid-state imaging device, wherein
the solid-state imaging device has
a pixel part in which pixels for performing photoelectric conversion are arranged and
a reading circuit which reads out pixel signals from the pixels in the pixel part,
each pixel includes
a photoelectric conversion circuit which accumulates a charge generated by photoelectric conversion in an integration period,
a transfer circuit capable of transferring the charge accumulated in the photoelectric conversion circuit in a transfer period after the integration period,
an output node formed by a floating diffusion to which the charge accumulated in the photoelectric conversion circuit is transferred through the transfer circuit,
an output buffer part which converts the charge at the output node to a voltage signal corresponding to a quantity of the charge and outputs the converted voltage signal,
a comparator which performs comparison processing comparing the voltage signal of the output buffer part and a reference voltage and outputting a digitized comparison result signal, and
a memory part for storing data corresponding to the comparison result signal of the comparator, and
the comparator, under the control of the reading circuit, performs
a first comparison processing for outputting a digitized first comparison result signal with respect to the voltage signal corresponding to an overflow charge overflowing from the photoelectric conversion circuit to the output node in the integration period, and
a second comparison processing for outputting a digitized second comparison result signal with respect to the voltage signal corresponding to the accumulated charge of the photoelectric conversion circuit transferred to the output node in the transfer period after the integration period, and
in the first comparison processing, starts an analog-to-digital (AD) conversion processing for comparing the voltage signal of the output buffer part and the reference voltage and outputting the digitized comparison result signal, with a delay from a starting time of the first comparison processing.

\* \* \* \* \*